US011822520B2

(12) United States Patent
Natarajan et al.

(10) Patent No.: US 11,822,520 B2
(45) Date of Patent: *Nov. 21, 2023

(54) FREEING PAGES WITHIN PERSISTENT MEMORY

(71) Applicant: NetApp Inc., San Jose, CA (US)

(72) Inventors: Rupa Natarajan, Sunnyvale, CA (US); Ananthan Subramanian, San Ramon, CA (US)

(73) Assignee: NetApp, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/958,497

(22) Filed: Oct. 3, 2022

(65) Prior Publication Data

US 2023/0024485 A1    Jan. 26, 2023

Related U.S. Application Data

(63) Continuation of application No. 16/852,584, filed on Apr. 20, 2020, now Pat. No. 11,461,281.

(51) Int. Cl.
*G06F 16/00* (2019.01)
*G06F 16/18* (2019.01)
*G06F 16/16* (2019.01)
*G06F 16/22* (2019.01)

(52) U.S. Cl.
CPC ........ *G06F 16/1805* (2019.01); *G06F 16/162* (2019.01); *G06F 16/2246* (2019.01)

(58) Field of Classification Search
None
See application file for complete search history.

(56) References Cited

U.S. PATENT DOCUMENTS

| | | | |
|---|---|---|---|
| 7,130,983 B1 | 10/2006 | DeTar, Jr. et al. | |
| 7,921,086 B1 | 4/2011 | Bromley et al. | |
| 9,223,843 B1* | 12/2015 | Madhavarapu | G06F 16/2365 |
| 9,442,955 B1* | 9/2016 | Pawar | G06F 16/1865 |
| 10,360,149 B2* | 7/2019 | Marathe | G06F 12/0804 |
| 10,534,768 B2* | 1/2020 | Madhavarapu | G06F 16/2358 |
| 10,552,359 B2* | 2/2020 | Xue | G06F 13/36 |
| 10,606,803 B2* | 3/2020 | Golander | G06F 3/0679 |
| 10,719,479 B2* | 7/2020 | Golander | G06F 16/13 |

(Continued)

OTHER PUBLICATIONS

Better I/O through byte-addressable, persistent memory, Condit et al., ACM (Year: 2009).*

(Continued)

*Primary Examiner* — Jean M Corrielus
(74) *Attorney, Agent, or Firm* — COOPER LEGAL GROUP, LLC

(57) ABSTRACT

Techniques are provided for utilizing a log to free pages from persistent memory. A log is maintained to comprise a list of page block numbers of pages within persistent memory of a node to free. A page block number, of a page, within the log is identified for processing. A reference count, corresponding to a number of references to the page block number, is identified. In response to the reference count being greater than 1, the reference count is decremented and the page block number is removed from the log. In response to the reference count being 1, the page is freed from the persistent memory and the page block number is removed from the log.

20 Claims, 13 Drawing Sheets

(56) References Cited

U.S. PATENT DOCUMENTS

| | | | |
|---|---|---|---|
| 10,983,955 B2* | 4/2021 | Golander | G06F 16/9024 |
| 11,063,601 B1* | 7/2021 | Kesavan | G06F 3/0653 |
| 2016/0110408 A1* | 4/2016 | Madhavarapu | G06F 16/2358 |
| | | | 707/615 |
| 2016/0246814 A1 | 8/2016 | Picken et al. | |
| 2016/0371295 A1 | 12/2016 | Aronovich et al. | |
| 2017/0371889 A1* | 12/2017 | Golander | G06F 16/275 |
| 2017/0371947 A1* | 12/2017 | Golander | G06F 16/13 |
| 2018/0046552 A1* | 2/2018 | Madhavarapu | G06F 11/2097 |
| 2020/0320036 A1* | 10/2020 | Golander | G06F 3/065 |
| 2021/0326216 A1* | 10/2021 | Subramanian | G06F 3/0661 |
| 2021/0326266 A1* | 10/2021 | Curtis-Maury | G06F 11/1469 |
| 2021/0326309 A1* | 10/2021 | Natarajan | G06F 16/2246 |
| 2021/0328593 A1* | 10/2021 | Kesavan | G06F 16/14 |
| 2021/0405854 A1* | 12/2021 | Ahlberg | G06Q 10/10 |

OTHER PUBLICATIONS

"Access Control Mechanisms in a Distributed, Persistent Memory System", Oct. 2002, Lanfranco Lopriore, IEEE Transactions on Parallel and Distributed Systems, vol. 13, No. 10, pp. 1066-1083.

* cited by examiner

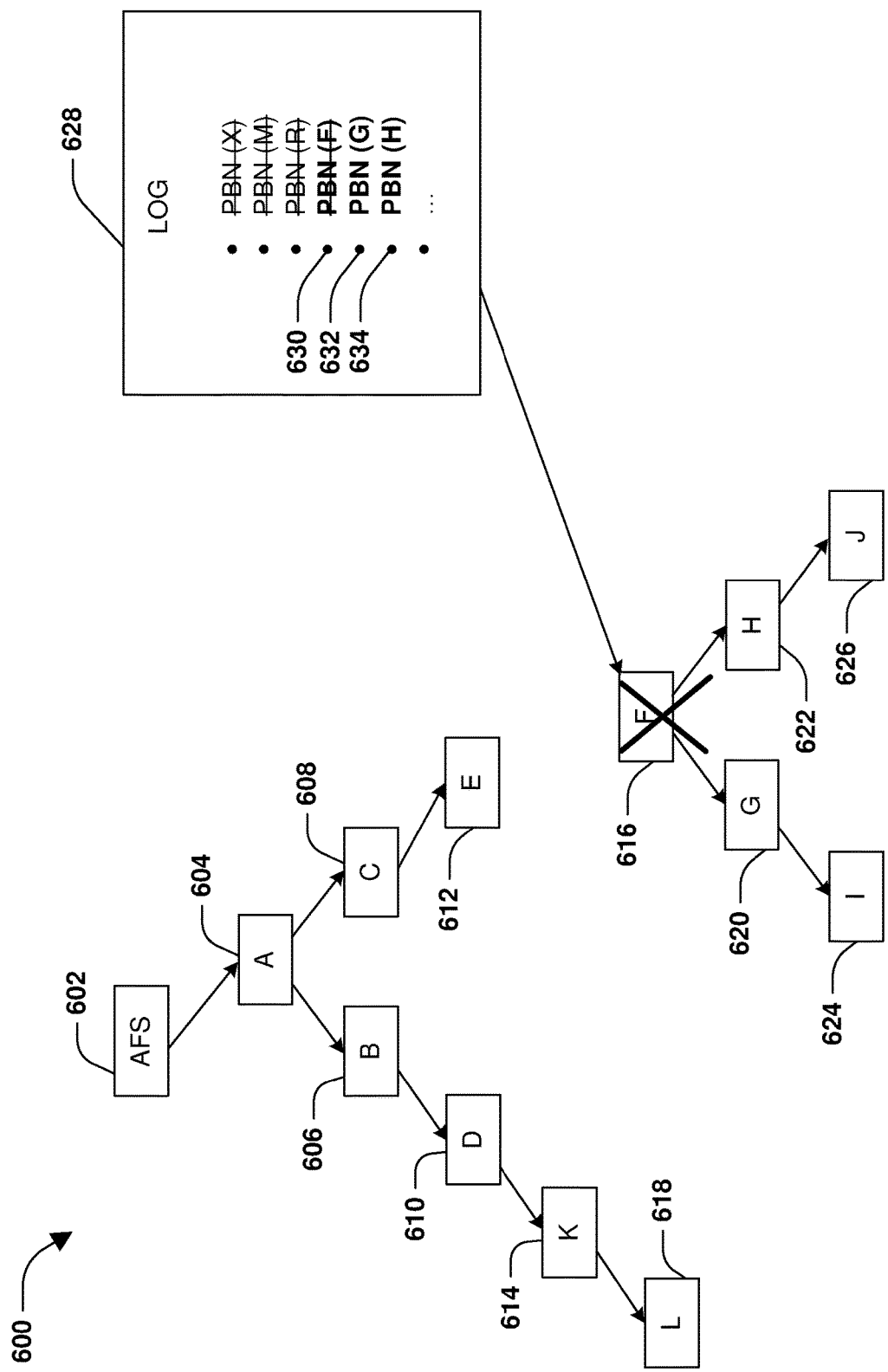

FREEING PAGES WITHIN PERSISTENT MEMORY

CROSS-REFERENCE TO RELATED APPLICATIONS

This application is a continuation of U.S. patent application Ser. No. 16/852,584, filed on Apr. 20, 2020 and titled "FREEING PAGES WITHIN PERSISTENT MEMORY," which is incorporated herein by reference.

BACKGROUND

A node, such as a server, a computing device, a virtual machine, etc., may host a storage operating system. The storage operating system may be configured to store data on behalf of client devices, such as within volumes, aggregates, storage devices, cloud storage, locally attached storage, etc. In this way, a client can issue a read operation or a write operation to the storage operating system of the node in order to read data from storage or write data to the storage. The storage operating system may implement a file system through which the data is organized and accessible to the client devices. Certain operations such as delete operations, truncate operations, snapshot delete operations, volume delete operations, overwrite operations, and/or other operations may take a substantial amount of time to process. Waiting for these operations to fully complete before responding back to a client device will increase client latency and the processing of client I/O. Such increased client latency would mitigate any performance benefits that could otherwise be achieved if the node utilizes low latency persistent memory to store data.

DESCRIPTION OF THE DRAWINGS

FIG. 6C is a block diagram illustrating an example system for freeing pages within persistent memory, where a page block number (F) is processed.

DETAILED DESCRIPTION

Figure 1:
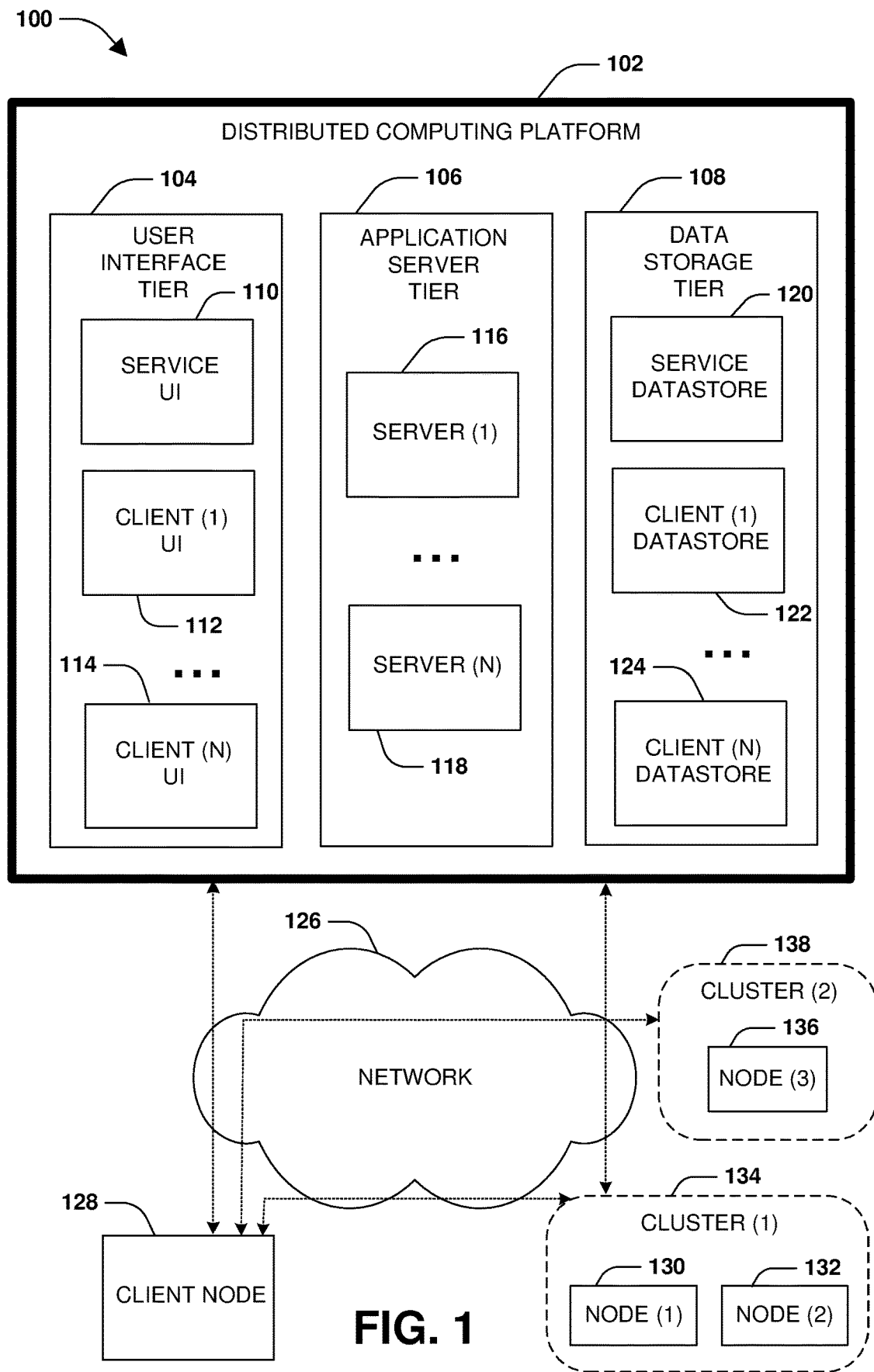
FIG. 1 is a block diagram illustrating an example computing environment in which an embodiment of the invention may be implemented.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

A node may be implemented as a computing device, a server, an on-premise device, a virtual machine, hardware, software, or combination thereof. The node may be configured to manage storage on behalf of client devices using various types of storage, such as hard disk drives, solid state drives, cloud storage, memory, persistent memory, or other types of storage within which client data may be stored through volumes, aggregates, cloud storage objects, etc. The node may manage this storage utilizing a storage operating system and a file system for organizing and managing the client data. In an embodiment, the file system may be tailored for a certain type of storage, such as having APIs, data structures, and functionality capable of accessing and storing data within byte-addressable storage such as persistent memory. In this way, a client device can connect to the node in order to access the client data through the file system, such as data stored in the persistent memory.

The node may utilize the persistent memory to improve performance and processing of client I/O because persistent memory provides relatively lower latency and faster access speeds compared to other storage, such as disk drives, solid state drives, and cloud storage. The persistent memory is byte-addressable and provides similar access characteristics and semantics as memory, such as dynamic random-access memory (DRAM). The node may host a storage operating system that implements a file system to store and access data within pages of the persistent memory. For example, the persistent memory may be indexed into pages, such as 4 kb pages or any other size of pages, using page block numbers. The file system may represent storage objects, such as LUNs and files, as page trees. For example, a page tree of a file may comprise a root, one or more levels of indirect pages that point to pages within a lower level, and a bottom level of user data pages. The page tree may be traversed down to a user data page in order to access data stored within the user data page of the persistent memory.

A frontend of the node may receive operations from client devices, and execute those operations upon the persistent memory using the file system. Certain operations may delete data from the persistent memory, thus freeing pages within the persistent memory. For example, a page tree or a subtree of a page tree may be freed when performing logical unit number (LUN) delete operations, LUN truncate operations, snapshot delete operations, volume delete operations, overwrite operations, and/or other operations. These operations can take a substantial amount of time to complete because of the additional time it takes to free the pages of the deleted data from the persistent memory. This will increase the processing time for the frontend to complete execution of such operations and respond back to client devices. This increase in processing time will increase latency experienced by the client devices, which may nullify any reduced latency that otherwise could have been achieved by using the lower latency persistent memory for processing these types of operations.

Accordingly, as provided herein, a log is implemented for freeing pages within the persistent memory. When a frontend process of the node executes an operation from a client device that will free a page within the persistent memory, the frontend process will add a page block number of the page into the log. The frontend process can complete the operation and respond back to the client device without having to actually free the page. This reduces the processing time of the operation, and thus reduces latency experienced by the client device. A background worker, executing within a backend of the node, will process the log in order to free the page and/or pages of other page block numbers within the log asynchronously.

FIG. 1 is a diagram illustrating an example operating environment 100 in which an embodiment of the techniques described herein may be implemented. In one example, the techniques described herein may be implemented within a client device 128, such as a laptop, a tablet, a personal computer, a mobile device, a server, a virtual machine, a wearable device, etc. In another example, the techniques described herein may be implemented within one or more nodes, such as a first node 130 and/or a second node 132 within a first cluster 134, a third node 136 within a second cluster 138, etc. A node may comprise a storage controller, a server, an on-premise device, a virtual machine such as a storage virtual machine, hardware, software, or combination thereof. The one or more nodes may be configured to manage the storage and access to data on behalf of the client device 128 and/or other client devices. In another example, the techniques described herein may be implemented within a distributed computing platform 102 such as a cloud computing environment (e.g., a cloud storage environment, a multi-tenant platform, a hyperscale infrastructure comprising scalable server architectures and virtual networking, etc.) configured to manage the storage and access to data on behalf of client devices and/or nodes.

In yet another example, at least some of the techniques described herein are implemented across one or more of the client device 128, the one or more nodes 130, 132, and/or 136, and/or the distributed computing platform 102. For example, the client device 128 may transmit operations, such as data operations to read data and write data and metadata operations (e.g., a create file operation, a rename directory operation, a resize operation, a set attribute operation, etc.), over a network 126 to the first node 130 for implementation by the first node 130 upon storage. The first node 130 may store data associated with the operations within volumes or other data objects/structures hosted within locally attached storage, remote storage hosted by other computing devices accessible over the network 126, storage provided by the distributed computing platform 102, etc. The first node 130 may replicate the data and/or the operations to other computing devices, such as to the second node 132, the third node 136, a storage virtual machine executing within the distributed computing platform 102, etc., so that one or more replicas of the data are maintained. For example, the third node 136 may host a destination storage volume that is maintained as a replica of a source storage volume of the first node 130. Such replicas can be used for disaster recovery and failover.

In an embodiment, the techniques described herein are implemented by a storage operating system or are implemented by a separate module that interacts with the storage operating system. The storage operating system may be hosted by the client device, 128, a node, the distributed computing platform 102, or across a combination thereof. In an example, the storage operating system may execute within a storage virtual machine, a hyperscaler, or other computing environment. The storage operating system may implement a storage file system to logically organize data within storage devices as one or more storage objects and provide a logical/virtual representation of how the storage objects are organized on the storage devices. A storage object may comprise any logically definable storage element stored by the storage operating system (e.g., a volume stored by the first node 130, a cloud object stored by the distributed computing platform 102, etc.). Each storage object may be associated with a unique identifier that uniquely identifies the storage object. For example, a volume may be associated with a volume identifier uniquely identifying that volume from other volumes. The storage operating system also manages client access to the storage objects.

The storage operating system may implement a file system for logically organizing data. For example, the storage operating system may implement a write anywhere file layout for a volume where modified data for a file may be written to any available location as opposed to a write-in-place architecture where modified data is written to the original location, thereby overwriting the previous data. In an example, the file system may be implemented through a file system layer that stores data of the storage objects in an on-disk format representation that is block-based (e.g., data is stored within 4 kilobyte blocks and inodes are used to identify files and file attributes such as creation time, access permissions, size and block location, etc.).

In an example, deduplication may be implemented by a deduplication module associated with the storage operating system. Deduplication is performed to improve storage efficiency. One type of deduplication is inline deduplication that ensures blocks are deduplicated before being written to a storage device. Inline deduplication uses a data structure, such as an incore hash store, which maps fingerprints of data to data blocks of the storage device storing the data. Whenever data is to be written to the storage device, a fingerprint of that data is calculated and the data structure is looked up using the fingerprint to find duplicates (e.g., potentially duplicate data already stored within the storage device). If duplicate data is found, then the duplicate data is loaded from the storage device and a byte by byte comparison may be performed to ensure that the duplicate data is an actual duplicate of the data to be written to the storage device. If the data to be written is a duplicate of the loaded duplicate data, then the data to be written to disk is not redundantly stored to the storage device. Instead, a pointer or other reference is stored in the storage device in place of the data to be written to the storage device. The pointer points to the duplicate data already stored in the storage device. A reference count for the data may be incremented to indicate that the pointer now references the data. If at some point the pointer no longer references the data (e.g., the deduplicated data is deleted and thus no longer references the data in the storage device), then the reference count is decremented. In this way, inline deduplication is able to deduplicate data before the data is written to disk. This improves the storage efficiency of the storage device.

Background deduplication is another type of deduplication that deduplicates data already written to a storage device. Various types of background deduplication may be implemented. In an example of background deduplication, data blocks that are duplicated between files are rearranged within storage units such that one copy of the data occupies physical storage. References to the single copy can be inserted into a file system structure such that all files or containers that contain the data refer to the same instance of the data. Deduplication can be performed on a data storage device block basis. In an example, data blocks on a storage device can be identified using a physical volume block number. The physical volume block number uniquely identifies a particular block on the storage device. Additionally, blocks within a file can be identified by a file block number. The file block number is a logical block number that indicates the logical position of a block within a file relative to other blocks in the file. For example, file block number 0 represents the first block of a file, file block number 1 represents the second block, etc. File block numbers can be mapped to a physical volume block number that is the actual data block on the storage device. During deduplication operations, blocks in a file that contain the same data are deduplicated by mapping the file block number for the block to the same physical volume block number, and maintaining a reference count of the number of file block numbers that map to the physical volume block number. For example, assume that file block number 0 and file block number 5 of a file contain the same data, while file block numbers 1-4 contain unique data. File block numbers 1-4 are mapped to different physical volume block numbers. File block number 0 and file block number 5 may be mapped to the same physical volume block number, thereby reducing storage requirements for the file. Similarly, blocks in different files that contain the same data can be mapped to the same physical volume block number. For example, if file block number 0 of file A contains the same data as file block number 3 of file B, file block number 0 of file A may be mapped to the same physical volume block number as file block number 3 of file B.

In another example of background deduplication, a changelog is utilized to track blocks that are written to the storage device. Background deduplication also maintains a fingerprint database (e.g., a flat metafile) that tracks all unique block data such as by tracking a fingerprint and other filesystem metadata associated with block data. Background deduplication can be periodically executed or triggered based upon an event such as when the changelog fills beyond a threshold. As part of background deduplication, data in both the changelog and the fingerprint database is sorted based upon fingerprints. This ensures that all duplicates are sorted next to each other. The duplicates are moved to a dup file. The unique changelog entries are moved to the fingerprint database, which will serve as duplicate data for a next deduplication operation. In order to optimize certain filesystem operations needed to deduplicate a block, duplicate records in the dup file are sorted in certain filesystem sematic order (e.g., inode number and block number). Next, the duplicate data is loaded from the storage device and a whole block byte by byte comparison is performed to make sure duplicate data is an actual duplicate of the data to be written to the storage device. After, the block in the changelog is modified to point directly to the duplicate data as opposed to redundantly storing data of the block.

In an example, deduplication operations performed by a data deduplication layer of a node can be leveraged for use on another node during data replication operations. For example, the first node 130 may perform deduplication operations to provide for storage efficiency with respect to data stored on a storage volume. The benefit of the deduplication operations performed on first node 130 can be provided to the second node 132 with respect to the data on first node 130 that is replicated to the second node 132. In some aspects, a data transfer protocol, referred to as the LRSE (Logical Replication for Storage Efficiency) protocol, can be used as part of replicating consistency group differences from the first node 130 to the second node 132. In the LRSE protocol, the second node 132 maintains a history buffer that keeps track of data blocks that it has previously received. The history buffer tracks the physical volume block numbers and file block numbers associated with the data blocks that have been transferred from first node 130 to the second node 132. A request can be made of the first node 130 to not transfer blocks that have already been transferred. Thus, the second node 132 can receive deduplicated data from the first node 130, and will not need to perform deduplication operations on the deduplicated data replicated from first node 130.

In an example, the first node 130 may preserve deduplication of data that is transmitted from first node 130 to the distributed computing platform 102. For example, the first node 130 may create an object comprising deduplicated data. The object is transmitted from the first node 130 to the distributed computing platform 102 for storage. In this way, the object within the distributed computing platform 102 maintains the data in a deduplicated state. Furthermore, deduplication may be preserved when deduplicated data is transmitted/replicated/mirrored between the client device 128, the first node 130, the distributed computing platform 102, and/or other nodes or devices.

In an example, compression may be implemented by a compression module associated with the storage operating system. The compression module may utilize various types of compression techniques to replace longer sequences of data (e.g., frequently occurring and/or redundant sequences) with shorter sequences, such as by using Huffman coding, arithmetic coding, compression dictionaries, etc. For example, an uncompressed portion of a file may comprise "ggggnnnnnnnqqqqqqqqqq", which is compressed to become "4g6n10q". In this way, the size of the file can be reduced to improve storage efficiency. Compression may be implemented for compression groups. A compression group may correspond to a compressed group of blocks. The compression group may be represented by virtual volume block numbers. The compression group may comprise contiguous or non-contiguous blocks.

Compression may be preserved when compressed data is transmitted/replicated/mirrored between the client device 128, a node, the distributed computing platform 102, and/or other nodes or devices. For example, an object may be created by the first node 130 to comprise compressed data. The object is transmitted from the first node 130 to the distributed computing platform 102 for storage. In this way, the object within the distributed computing platform 102 maintains the data in a compressed state.

In an example, various types of synchronization may be implemented by a synchronization module associated with the storage operating system. In an example, synchronous replication may be implemented, such as between the first node 130 and the second node 132. It may be appreciated that the synchronization module may implement synchronous replication between any devices within the operating environment 100, such as between the first node 130 of the first cluster 134 and the third node 136 of the second cluster 138 and/or between a node of a cluster and an instance of a node or virtual machine in the distributed computing platform 102.

As an example, during synchronous replication, the first node 130 may receive a write operation from the client device 128. The write operation may target a file stored within a volume managed by the first node 130. The first node 130 replicates the write operation to create a replicated write operation. The first node 130 locally implements the write operation upon the file within the volume. The first node 130 also transmits the replicated write operation to a synchronous replication target, such as the second node 132 that maintains a replica volume as a replica of the volume maintained by the first node 130. The second node 132 will execute the replicated write operation upon the replica volume so that file within the volume and the replica volume comprises the same data. After, the second node 132 will transmit a success message to the first node 130. With synchronous replication, the first node 130 does not respond with a success message to the client device 128 for the write operation until both the write operation is executed upon the volume and the first node 130 receives the success message that the second node 132 executed the replicated write operation upon the replica volume.

In another example, asynchronous replication may be implemented, such as between the first node 130 and the third node 136. It may be appreciated that the synchronization module may implement asynchronous replication between any devices within the operating environment 100, such as between the first node 130 of the first cluster 134 and the distributed computing platform 102. In an example, the first node 130 may establish an asynchronous replication relationship with the third node 136. The first node 130 may capture a baseline snapshot of a first volume as a point in time representation of the first volume. The first node 130 may utilize the baseline snapshot to perform a baseline transfer of the data within the first volume to the third node 136 in order to create a second volume within the third node 136 comprising data of the first volume as of the point in time at which the baseline snapshot was created.

After the baseline transfer, the first node 130 may subsequently create snapshots of the first volume over time. As part of asynchronous replication, an incremental transfer is performed between the first volume and the second volume. In particular, a snapshot of the first volume is created. The snapshot is compared with a prior snapshot that was previously used to perform the last asynchronous transfer (e.g., the baseline transfer or a prior incremental transfer) of data to identify a difference in data of the first volume between the snapshot and the prior snapshot (e.g., changes to the first volume since the last asynchronous transfer). Accordingly, the difference in data is incrementally transferred from the first volume to the second volume. In this way, the second volume will comprise the same data as the first volume as of the point in time when the snapshot was created for performing the incremental transfer. It may be appreciated that other types of replication may be implemented, such as semi-sync replication.

In an embodiment, the first node 130 may store data or a portion thereof within storage hosted by the distributed computing platform 102 by transmitting the data within objects to the distributed computing platform 102. In one example, the first node 130 may locally store frequently accessed data within locally attached storage. Less frequently accessed data may be transmitted to the distributed computing platform 102 for storage within a data storage tier 108. The data storage tier 108 may store data within a service data store 120, and may store client specific data within client data stores assigned to such clients such as a client (1) data store 122 used to store data of a client (1) and a client (N) data store 124 used to store data of a client (N). The data stores may be physical storage devices or may be defined as logical storage, such as a virtual volume, LUNs, or other logical organizations of data that can be defined across one or more physical storage devices. In another example, the first node 130 transmits and stores all client data to the distributed computing platform 102. In yet another example, the client device 128 transmits and stores the data directly to the distributed computing platform 102 without the use of the first node 130.

The management of storage and access to data can be performed by one or more storage virtual machines (SVMs) or other storage applications that provide software as a service (SaaS) such as storage software services. In one example, an SVM may be hosted within the client device 128, within the first node 130, or within the distributed computing platform 102 such as by the application server tier 106. In another example, one or more SVMs may be hosted across one or more of the client device 128, the first node 130, and the distributed computing platform 102. The one or more SVMs may host instances of the storage operating system.

In an example, the storage operating system may be implemented for the distributed computing platform 102. The storage operating system may allow client devices to access data stored within the distributed computing platform 102 using various types of protocols, such as a Network File System (NFS) protocol, a Server Message Block (SMB) protocol and Common Internet File System (CIFS), and Internet Small Computer Systems Interface (iSCSI), and/or other protocols. The storage operating system may provide various storage services, such as disaster recovery (e.g., the ability to non-disruptively transition client devices from accessing a primary node that has failed to a secondary node that is taking over for the failed primary node), backup and archive function, replication such as asynchronous and/or synchronous replication, deduplication, compression, high availability storage, cloning functionality (e.g., the ability to clone a volume, such as a space efficient flex clone), snapshot functionality (e.g., the ability to create snapshots and restore data from snapshots), data tiering (e.g., migrating infrequently accessed data to slower/cheaper storage), encryption, managing storage across various platforms such as between on-premise storage systems and multiple cloud systems, etc.

In one example of the distributed computing platform 102, one or more SVMs may be hosted by the application server tier 106. For example, a server (1) 116 is configured to host SVMs used to execute applications such as storage applications that manage the storage of data of the client (1) within the client (1) data store 122. Thus, an SVM executing on the server (1) 116 may receive data and/or operations from the client device 128 and/or the first node 130 over the network 126. The SVM executes a storage application and/or an instance of the storage operating system to process the operations and/or store the data within the client (1) data store 122. The SVM may transmit a response back to the client device 128 and/or the first node 130 over the network 126, such as a success message or an error message. In this way, the application server tier 106 may host SVMs, services, and/or other storage applications using the server (1) 116, the server (N) 118, etc.

A user interface tier 104 of the distributed computing platform 102 may provide the client device 128 and/or the first node 130 with access to user interfaces associated with the storage and access of data and/or other services provided by the distributed computing platform 102. In an example, a service user interface 110 may be accessible from the distributed computing platform 102 for accessing services subscribed to by clients and/or nodes, such as data replication services, application hosting services, data security services, human resource services, warehouse tracking services, accounting services, etc. For example, client user interfaces may be provided to corresponding clients, such as a client (1) user interface 112, a client (N) user interface 114, etc. The client (1) can access various services and resources subscribed to by the client (1) through the client (1) user interface 112, such as access to a web service, a development environment, a human resource application, a warehouse tracking application, and/or other services and resources provided by the application server tier 106, which may use data stored within the data storage tier 108.

The client device 128 and/or the first node 130 may subscribe to certain types and amounts of services and resources provided by the distributed computing platform 102. For example, the client device 128 may establish a subscription to have access to three virtual machines, a certain amount of storage, a certain type/amount of data redundancy, a certain type/amount of data security, certain service level agreements (SLAs) and service level objectives (SLOs), latency guarantees, bandwidth guarantees, access to execute or host certain applications, etc. Similarly, the first node 130 can establish a subscription to have access to certain services and resources of the distributed computing platform 102.

As shown, a variety of clients, such as the client device 128 and the first node 130, incorporating and/or incorporated into a variety of computing devices may communicate with the distributed computing platform 102 through one or more networks, such as the network 126. For example, a client may incorporate and/or be incorporated into a client application (e.g., software) implemented at least in part by one or more of the computing devices.

Examples of suitable computing devices include personal computers, server computers, desktop computers, nodes, storage servers, nodes, laptop computers, notebook computers, tablet computers or personal digital assistants (PDAs), smart phones, cell phones, and consumer electronic devices incorporating one or more computing device components, such as one or more electronic processors, microprocessors, central processing units (CPU), or controllers. Examples of suitable networks include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing platform 102, such as a multi-tenant business data processing platform or cloud computing environment, may include multiple processing tiers, including the user interface tier 104, the application server tier 106, and a data storage tier 108. The user interface tier 104 may maintain multiple user interfaces, including graphical user interfaces and/or web-based interfaces. The user interfaces may include the service user interface 110 for a service to provide access to applications and data for a client (e.g., a "tenant") of the service, as well as one or more user interfaces that have been specialized/customized in accordance with user specific requirements (e.g., as discussed above), which may be accessed via one or more APIs.

The service user interface 110 may include components enabling a tenant to administer the tenant's participation in the functions and capabilities provided by the distributed computing platform 102, such as accessing data, causing execution of specific data processing operations, etc. Each processing tier may be implemented with a set of computers, virtualized computing environments such as a storage virtual machine or storage virtual server, and/or computer components including computer servers and processors, and may perform various functions, methods, processes, or operations as determined by the execution of a software application or set of instructions.

The data storage tier 108 may include one or more data stores, which may include the service data store 120 and one or more client data stores 122-124. Each client data store may contain tenant-specific data that is used as part of providing a range of tenant-specific business and storage services or functions, including but not limited to ERP, CRM, eCommerce, Human Resources management, payroll, storage services, etc. Data stores may be implemented with any suitable data storage technology, including structured query language (SQL) based relational database management systems (RDBMS), file systems hosted by operating systems, object storage, etc.

The distributed computing platform 102 may be a multi-tenant and service platform operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information or any other type of information.

Figure 2:
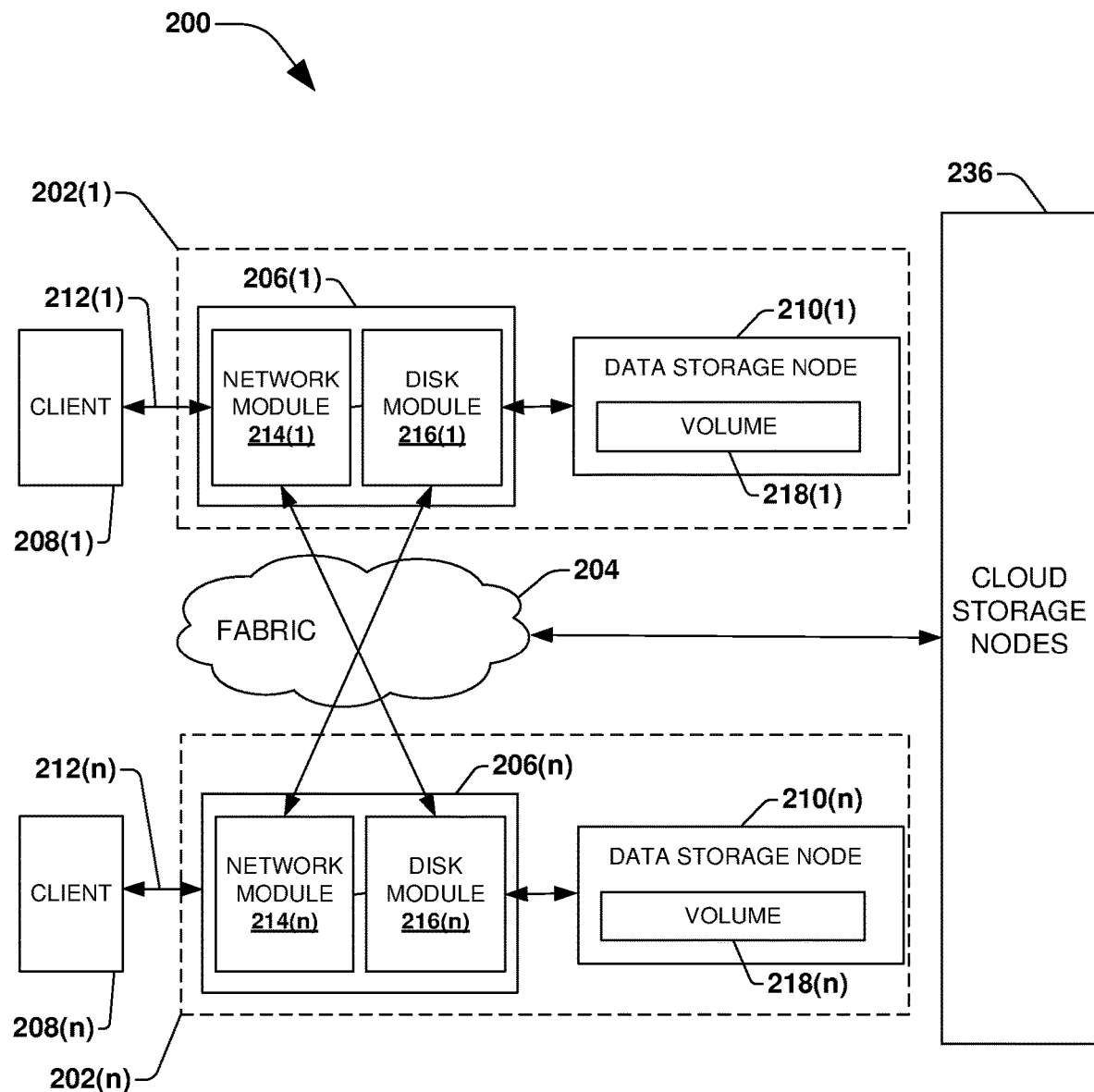
FIG. 2 is a block diagram illustrating a network environment with exemplary node computing devices.

A clustered network environment 200 that may implement one or more aspects of the techniques described and illustrated herein is shown in FIG. 2. The clustered network environment 200 includes data storage apparatuses 202(1)-202(n) that are coupled over a cluster or cluster fabric 204 that includes one or more communication network(s) and facilitates communication between the data storage apparatuses 202(1)-202(n) (and one or more modules, components, etc. therein, such as, node computing devices 206(1)-206(n), for example), although any number of other elements or components can also be included in the clustered network environment 200 in other examples. This technology provides a number of advantages including methods, non-transitory computer readable media, and computing devices that implement the techniques described herein.

In this example, node computing devices 206(1)-206(n) can be primary or local storage controllers or secondary or remote storage controllers that provide client devices 208(1)-208(n) with access to data stored within data storage devices 210(1)-210(n) and cloud storage device(s) 236 (also referred to as cloud storage node(s)). The node computing devices 206(1)-206(n) may be implemented as hardware, software (e.g., a storage virtual machine), or combination thereof.

The data storage apparatuses 202(1)-202(n) and/or node computing devices 206(1)-206(n) of the examples described and illustrated herein are not limited to any particular geographic areas and can be clustered locally and/or remotely via a cloud network, or not clustered in other examples. Thus, in one example the data storage apparatuses 202(1)-202(n) and/or node computing device 206(1)-206(n) can be distributed over a plurality of storage systems located in a plurality of geographic locations (e.g., located on-premise, located within a cloud computing environment, etc.); while in another example a clustered network can include data storage apparatuses 202(1)-202(n) and/or node computing device 206(1)-206(n) residing in a same geographic location (e.g., in a single on-site rack).

In the illustrated example, one or more of the client devices 208(1)-208(n), which may be, for example, personal computers (PCs), computing devices used for storage (e.g., storage servers), or other computers or peripheral devices, are coupled to the respective data storage apparatuses 202(1)-202(n) by network connections 212(1)-212(n). Network connections 212(1)-212(n) may include a local area network (LAN) or wide area network (WAN) (i.e., a cloud network), for example, that utilize TCP/IP and/or one or more Network Attached Storage (NAS) protocols, such as a Common Internet Filesystem (CIFS) protocol or a Network Filesystem (NFS) protocol to exchange data packets, a Storage Area Network (SAN) protocol, such as Small Computer System Interface (SCSI) or Fiber Channel Protocol (FCP), an object protocol, such as simple storage service (S3), and/or non-volatile memory express (NVMe), for example.

Illustratively, the client devices 208(1)-208(n) may be general-purpose computers running applications and may interact with the data storage apparatuses 202(1)-202(n) using a client/server model for exchange of information. That is, the client devices 208(1)-208(n) may request data from the data storage apparatuses 202(1)-202(n) (e.g., data on one of the data storage devices 210(1)-210(n) managed by a network storage controller configured to process I/O commands issued by the client devices 208(1)-208(n)), and the data storage apparatuses 202(1)-202(n) may return results of the request to the client devices 208(1)-208(n) via the network connections 212(1)-212(n).

The node computing devices 206(1)-206(n) of the data storage apparatuses 202(1)-202(n) can include network or host nodes that are interconnected as a cluster to provide data storage and management services, such as to an enterprise having remote locations, cloud storage (e.g., a storage endpoint may be stored within cloud storage device(s) 236), etc., for example. Such node computing devices 206(1)-206(n) can be attached to the cluster fabric 204 at a connection point, redistribution point, or communication endpoint, for example. One or more of the node computing devices 206(1)-206(n) may be capable of sending, receiving, and/or forwarding information over a network communications channel, and could comprise any type of device that meets any or all of these criteria.

In an example, the node computing devices 206(1) and 206(n) may be configured according to a disaster recovery configuration whereby a surviving node provides switchover access to the storage devices 210(1)-210(n) in the event a disaster occurs at a disaster storage site (e.g., the node computing device 206(1) provides client device 212(n) with switchover data access to data storage devices 210(n) in the event a disaster occurs at the second storage site). In other examples, the node computing device 206(n) can be configured according to an archival configuration and/or the node computing devices 206(1)-206(n) can be configured based on another type of replication arrangement (e.g., to facilitate load sharing). Additionally, while two node computing devices are illustrated in FIG. 2, any number of node computing devices or data storage apparatuses can be included in other examples in other types of configurations or arrangements.

As illustrated in the clustered network environment 200, node computing devices 206(1)-206(n) can include various functional components that coordinate to provide a distributed storage architecture. For example, the node computing devices 206(1)-206(n) can include network modules 214(1)-214(n) and disk modules 216(1)-216(n). Network modules 214(1)-214(n) can be configured to allow the node computing devices 206(1)-206(n) (e.g., network storage controllers) to connect with client devices 208(1)-208(n) over the storage network connections 212(1)-212(n), for example, allowing the client devices 208(1)-208(n) to access data stored in the clustered network environment 200.

Further, the network modules 214(1)-214(n) can provide connections with one or more other components through the cluster fabric 204. For example, the network module 214(1) of node computing device 206(1) can access the data storage device 210(n) by sending a request via the cluster fabric 204 through the disk module 216(n) of node computing device 206(n) when the node computing device 206(n) is available. Alternatively, when the node computing device 206(n) fails, the network module 214(1) of node computing device 206(1) can access the data storage device 210(n) directly via the cluster fabric 204. The cluster fabric 204 can include one or more local and/or wide area computing networks (i.e., cloud networks) embodied as Infiniband, Fibre Channel (FC), or Ethernet networks, for example, although other types of networks supporting other protocols can also be used.

Disk modules 216(1)-216(n) can be configured to connect data storage devices 210(1)-210(n), such as disks or arrays of disks, SSDs, flash memory, or some other form of data storage, to the node computing devices 206(1)-206(n). Often, disk modules 216(1)-216(n) communicate with the data storage devices 210(1)-210(n) according to the SAN protocol, such as SCSI or FCP, for example, although other protocols can also be used. Thus, as seen from an operating system on node computing devices 206(1)-206(n), the data storage devices 210(1)-210(n) can appear as locally attached. In this manner, different node computing devices 206(1)-206(n), etc. may access data blocks, files, or objects through the operating system, rather than expressly requesting abstract files.

While the clustered network environment 200 illustrates an equal number of network modules 214(1)-214(n) and disk modules 216(1)-216(n), other examples may include a differing number of these modules. For example, there may be a plurality of network and disk modules interconnected in a cluster that do not have a one-to-one correspondence between the network and disk modules. That is, different node computing devices can have a different number of network and disk modules, and the same node computing device can have a different number of network modules than disk modules.

Further, one or more of the client devices 208(1)-208(n) can be networked with the node computing devices 206(1)-206(n) in the cluster, over the storage connections 212(1)-212(n). As an example, respective client devices 208(1)-208(n) that are networked to a cluster may request services (e.g., exchanging of information in the form of data packets) of node computing devices 206(1)-206(n) in the cluster, and the node computing devices 206(1)-206(n) can return results of the requested services to the client devices 208(1)-208(n). In one example, the client devices 208(1)-208(n) can exchange information with the network modules 214(1)-214(n) residing in the node computing devices 206(1)-206(n) (e.g., network hosts) in the data storage apparatuses 202(1)-202(n).

In one example, the storage apparatuses 202(1)-202(n) host aggregates corresponding to physical local and remote data storage devices, such as local flash or disk storage in the data storage devices 210(1)-210(n), for example. One or more of the data storage devices 210(1)-210(n) can include mass storage devices, such as disks of a disk array. The disks may comprise any type of mass storage devices, including but not limited to magnetic disk drives, flash memory, and any other similar media adapted to store information, including, for example, data and/or parity information.

The aggregates include volumes 218(1)-218(n) in this example, although any number of volumes can be included in the aggregates. The volumes 218(1)-218(n) are virtual data stores or storage objects that define an arrangement of storage and one or more filesystems within the clustered network environment 200. Volumes 218(1)-218(n) can span a portion of a disk or other storage device, a collection of disks, or portions of disks, for example, and typically define an overall logical arrangement of data storage. In one example volumes 218(1)-218(n) can include stored user data as one or more files, blocks, or objects that may reside in a hierarchical directory structure within the volumes 218(1)-218(n).

Volumes 218(1)-218(n) are typically configured in formats that may be associated with particular storage systems, and respective volume formats typically comprise features that provide functionality to the volumes 218(1)-218(n), such as providing the ability for volumes 218(1)-218(n) to form clusters, among other functionality. Optionally, one or more of the volumes 218(1)-218(n) can be in composite aggregates and can extend between one or more of the data storage devices 210(1)-210(n) and one or more of the cloud storage device(s) 236 to provide tiered storage, for example, and other arrangements can also be used in other examples.

In one example, to facilitate access to data stored on the disks or other structures of the data storage devices 210(1)-210(n), a filesystem may be implemented that logically organizes the information as a hierarchical structure of directories and files. In this example, respective files may be implemented as a set of disk blocks of a particular size that are configured to store information, whereas directories may be implemented as specially formatted files in which information about other files and directories are stored.

Data can be stored as files or objects within a physical volume and/or a virtual volume, which can be associated with respective volume identifiers. The physical volumes correspond to at least a portion of physical storage devices, such as the data storage devices 210(1)-210(n) (e.g., a Redundant Array of Independent (or Inexpensive) Disks (RAID system)) whose address, addressable space, location, etc. does not change. Typically the location of the physical volumes does not change in that the range of addresses used to access it generally remains constant.

Virtual volumes, in contrast, can be stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows it to be resized and/or flexible in some regards.

Further, virtual volumes can include one or more logical unit numbers (LUNs), directories, Qtrees, files, and/or other storage objects, for example. Among other things, these features, but more particularly the LUNs, allow the disparate memory locations within which data is stored to be identified, for example, and grouped as data storage unit. As such, the LUNs may be characterized as constituting a virtual disk or drive upon which data within the virtual volumes is stored within an aggregate. For example, LUNs are often referred to as virtual drives, such that they emulate a hard drive, while they actually comprise data blocks stored in various parts of a volume.

In one example, the data storage devices 210(1)-210(n) can have one or more physical ports, wherein each physical port can be assigned a target address (e.g., SCSI target address). To represent respective volumes, a target address on the data storage devices 210(1)-210(n) can be used to identify one or more of the LUNs. Thus, for example, when one of the node computing devices 206(1)-206(n) connects to a volume, a connection between the one of the node computing devices 206(1)-206(n) and one or more of the LUNs underlying the volume is created.

Respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

Figure 3:
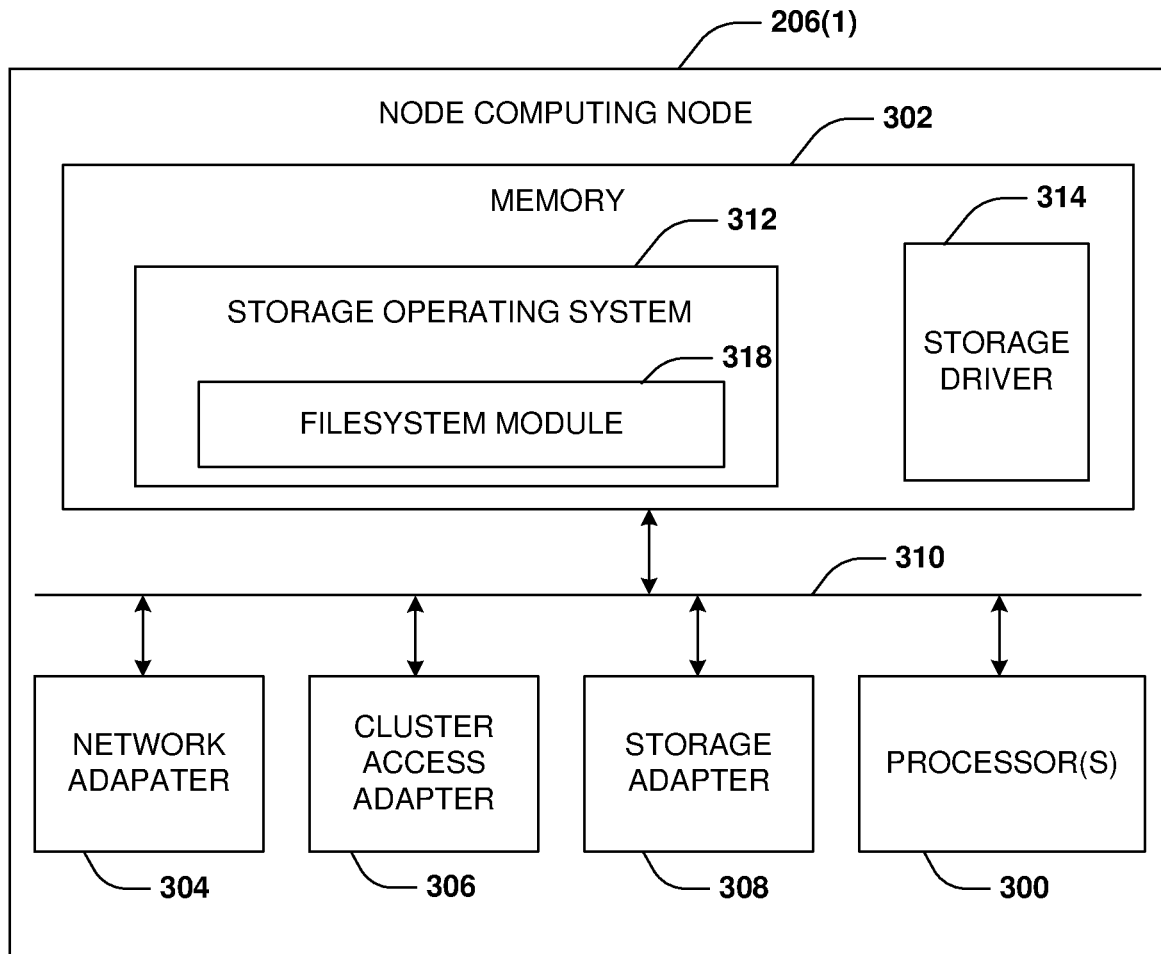
FIG. 3 is a block diagram illustrating an exemplary node computing device.

Referring to FIG. 3, node computing device 206(1) in this particular example includes processor(s) 300, a memory 302, a network adapter 304, a cluster access adapter 306, and a storage adapter 308 interconnected by a system bus 310. In other examples, the node computing device 206(1) comprises a virtual machine, such as a virtual storage machine. The node computing device 206(1) also includes a storage operating system 312 installed in the memory 302 that can, for example, implement a RAID data loss protection and recovery scheme to optimize reconstruction of data of a failed disk or drive in an array, along with other functionality such as deduplication, compression, snapshot creation, data mirroring, synchronous replication, asynchronous replication, encryption, etc. In some examples, the node computing device 206(n) is substantially the same in structure and/or operation as node computing device 206(1), although the node computing device 206(n) can also include a different structure and/or operation in one or more aspects than the node computing device 206(1).

The network adapter 304 in this example includes the mechanical, electrical and signaling circuitry needed to connect the node computing device 206(1) to one or more of the client devices 208(1)-208(n) over network connections 212(1)-212(n), which may comprise, among other things, a point-to-point connection or a shared medium, such as a local area network. In some examples, the network adapter 304 further communicates (e.g., using TCP/IP) via the cluster fabric 204 and/or another network (e.g. a WAN) (not shown) with cloud storage device(s) 236 to process storage operations associated with data stored thereon.

The storage adapter 308 cooperates with the storage operating system 312 executing on the node computing device 206(1) to access information requested by one of the client devices 208(1)-208(n) (e.g., to access data on a data storage device 210(1)-210(n) managed by a network storage controller). The information may be stored on any type of attached array of writeable media such as magnetic disk drives, flash memory, and/or any other similar media adapted to store information.

In the exemplary data storage devices 210(1)-210(n), information can be stored in data blocks on disks. The storage adapter 308 can include I/O interface circuitry that couples to the disks over an I/O interconnect arrangement, such as a storage area network (SAN) protocol (e.g., Small Computer System Interface (SCSI), Internet SCSI (iSCSI), hyperSCSI, Fiber Channel Protocol (FCP)). The information is retrieved by the storage adapter 308 and, if necessary, processed by the processor(s) 300 (or the storage adapter 308 itself) prior to being forwarded over the system bus 310 to the network adapter 304 (and/or the cluster access adapter 306 if sending to another node computing device in the cluster) where the information is formatted into a data packet and returned to a requesting one of the client devices 208(1)-208(n) and/or sent to another node computing device attached via the cluster fabric 204. In some examples, a storage driver 314 in the memory 302 interfaces with the storage adapter to facilitate interactions with the data storage devices 210(1)-210(n).

The storage operating system 312 can also manage communications for the node computing device 206(1) among other devices that may be in a clustered network, such as attached to a cluster fabric 204. Thus, the node computing device 206(1) can respond to client device requests to manage data on one of the data storage devices 210(1)-210(n) or cloud storage device(s) 236 (e.g., or additional clustered devices) in accordance with the client device requests.

The file system module 318 of the storage operating system 312 can establish and manage one or more filesystems including software code and data structures that implement a persistent hierarchical namespace of files and directories, for example. As an example, when a new data storage device (not shown) is added to a clustered network system, the file system module 318 is informed where, in an existing directory tree, new files associated with the new data storage device are to be stored. This is often referred to as "mounting" a filesystem.

In the example node computing device 206(1), memory 302 can include storage locations that are addressable by the processor(s) 300 and adapters 304, 306, and 308 for storing related software application code and data structures. The processor(s) 300 and adapters 304, 306, and 308 may, for example, include processing elements and/or logic circuitry configured to execute the software code and manipulate the data structures.

The storage operating system 312, portions of which are typically resident in the memory 302 and executed by the processor(s) 300, invokes storage operations in support of a file service implemented by the node computing device 206(1). Other processing and memory mechanisms, including various computer readable media, may be used for storing and/or executing application instructions pertaining to the techniques described and illustrated herein. For example, the storage operating system 312 can also utilize one or more control files (not shown) to aid in the provisioning of virtual machines.

In this particular example, the memory 302 also includes a module configured to implement the techniques described herein, including for example utilizing a log to free pages from persistent memory as discussed above and further below.

The examples of the technology described and illustrated herein may be embodied as one or more non-transitory computer or machine readable media, such as the memory 302, having machine or processor-executable instructions stored thereon for one or more aspects of the present technology, which when executed by processor(s), such as processor(s) 300, cause the processor(s) to carry out the steps necessary to implement the methods of this technology, as described and illustrated with the examples herein. In some examples, the executable instructions are configured to perform one or more steps of a method described and illustrated later.

Figure 4:
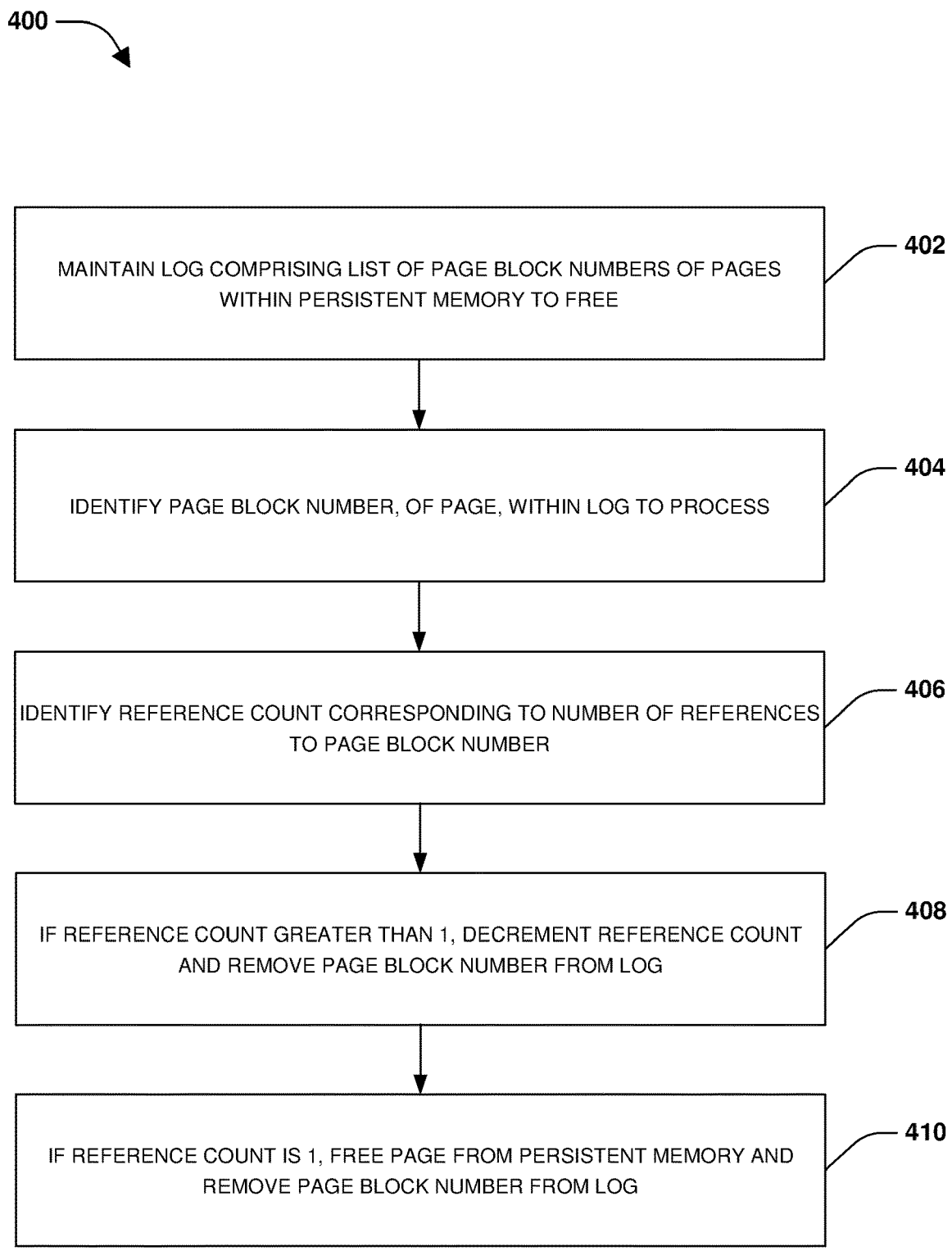
FIG. 4 is a flow chart illustrating an example method for freeing pages within persistent memory.
Figure 5:
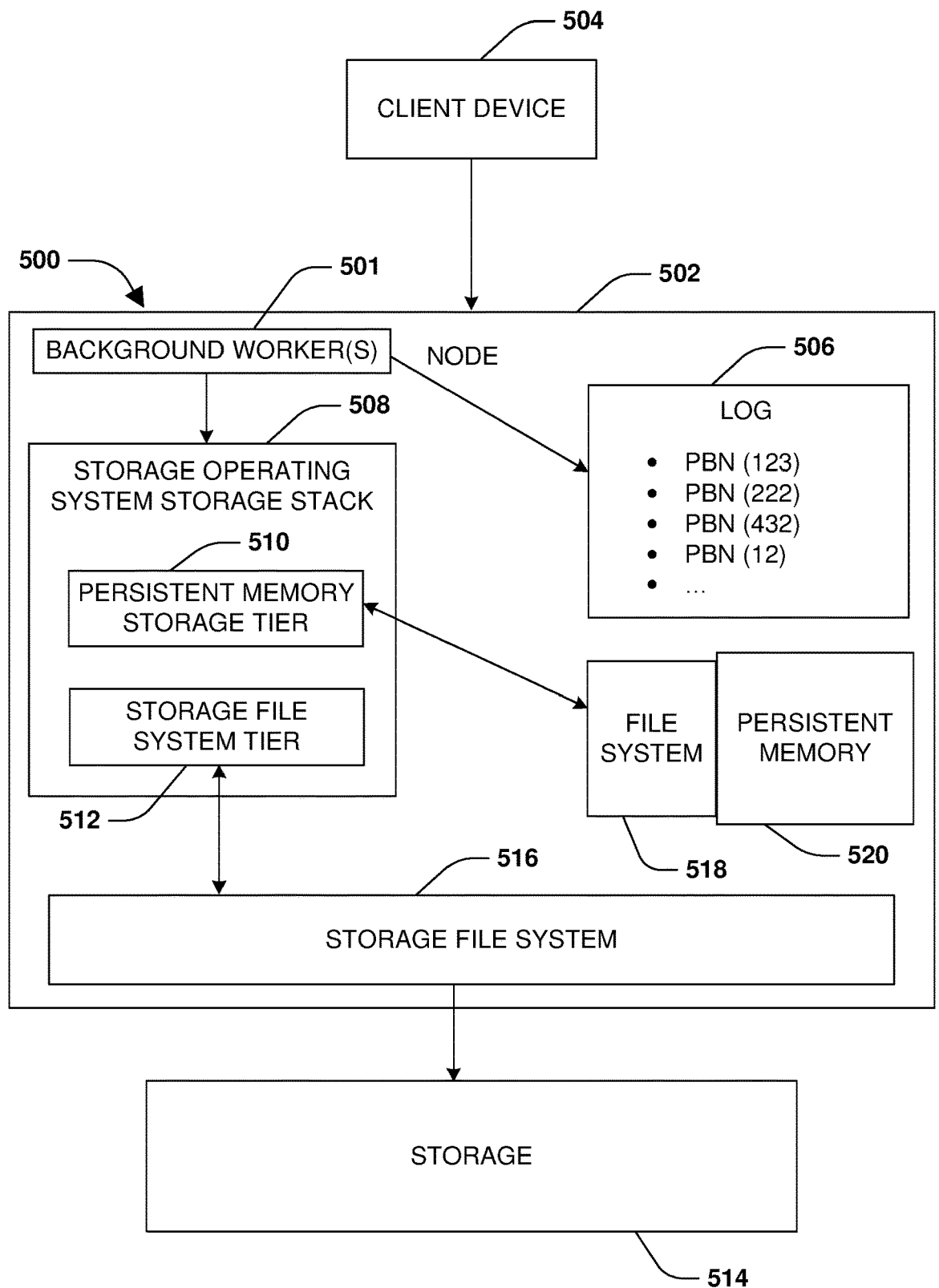
FIG. 5 is a block diagram illustrating an example system for freeing pages within persistent memory.

One embodiment of utilizing a log to free pages from persistent memory is illustrated by an exemplary method 400 of FIG. 4, which is further described in conjunction with system 500 of FIG. 5 and system 600 of FIGS. 6A-6G. A node 502 may comprise a server, an on-premise device, a virtual machine, computing resources of a cloud computing environment (e.g., a virtual machine hosted within the cloud), a computing device, hardware, software, or combination thereof. The node 502 may be configured to manage the storage and access of data on behalf of clients, such as a client device 504, as illustrated by FIG. 5A. The node 502 may host a storage operating system configured to store and manage data within and/or across various types of storage devices, such as locally attached storage, cloud storage, disk storage, flash storage, solid state drives, tape, hard disk drives, etc. The data may be stored within storage objects, such as volumes, logical unit numbers (LUNs), aggregates, cloud storage objects, etc. In an example, an aggregate or other storage object may be comprised of physical storage of a single storage device or storage of multiple storage devices or storage providers.

In an example, the storage operating system of the node 502 may store data (e.g., infrequently accessed data or data that has not been accessed for a threshold timespan) within storage 514, such as block-addressable storage (e.g., disk drives, solid state drives, etc.). The data within the storage 514 may be organized and accessible through a storage file system 516. The client device 504 may utilize the storage file system 516 in order to create, delete, organize, modify, and/or access files within directories of a volume managed by the storage file system 516. The storage file system 516 may be configured with commands, APIs, data structures (e.g., data structures used to identify block address locations of data within the storage 514), and/or other functionality (e.g., functionality to access certain block ranges within the storage 514) that is tailored to the block-addressable access semantics of the storage 514.

The storage operating system of the node 502 may also store data (e.g., frequently accessed data or data predicted to be accessed again within a threshold timespan) within a persistent memory 520 through a file system 518. The persistent memory 520 may be byte-addressable and provide relatively lower latency and faster access speeds than other types of storage such as disk storage, cloud storage, etc. The file system 518 may be configured with commands, APIs, data structures (e.g., data structures used to identify byte address locations of data within the persistent memory 520), and/or other functionality (e.g., functionality to access certain byte ranges within the persistent memory 520) that is tailored to the byte-addressable access semantics of the persistent memory 520.

The storage operating system of the node 502 may implement a storage operating system storage stack 508. The storage operating system storage stack 508 may comprise a persistent memory storage tier 510 used to manage the persistent memory 520 through the file system 518. The storage operating system storage stack 508 may comprise a storage file system tier 512 used to manage the storage 514 through the storage file system 516. An operation may first be processed by a highest level tier within the storage operating system storage stack 508, and then down through lower level tiers of the storage operating system storage stack 508 until reaching a lowest level tier of the storage operating system storage stack 508. For example, the persistent memory storage tier 510 may process an operation before the operation reaches the storage file system tier 512 because the persistent memory storage tier 510 is at a higher level within the storage operating system storage stack 508 than the storage file system tier 512. In this way, the persistent memory storage tier 510 may determine whether the operation should be directed to the file system 518 for execution upon the persistent memory 520 (e.g., the operation targets data within the persistent memory 520 or is writing to a file that is frequently accessed or predicted to be accessed again within a threshold timespan) or should be pass along to the storage file system tier 512 for directing the operation to the storage file system 516 for execution upon the storage 514 (e.g., the operation targets data within the storage 514 or is writing to an infrequently accessed file).

The file system 518 is configured with data structures for organizing, tracking, and locating data within the persistent memory 520 according to the byte-addressable semantics. For example, the file system 518 indexes the persistent memory 520 of the node 502 as an array of pages (e.g., 4 kb pages) indexed by page block numbers. Page (0) may be left unused in the event another data structure, such as an indirect page, accidently references the page (0), then the reference can be determined to be an accident. Page (1) comprises a file system superblock that is a root of a file system page tree of the file system 518. The file system superblock comprises a location of a list of file system info objects.

The list of file system info objects comprises a linked list of pages, where each page contains a set of file system info objects. Each file system info object defines a file system instance for a volume and snapshot (e.g., a first file system info object may correspond to an active file system of the volume, a second file system info object may correspond to a first snapshot of the volume, a third file system info object may correspond to a second snapshot of the volume, etc.). Each file system info object comprises a location within the persistent memory 520 of an inofile (e.g., a root of a page tree of the inofile) comprising inodes of a file system instance.

An inofile of a file system instance comprises an inode for each file within the file system instance. An inode of a file comprises metadata about the file. Each inode stores a location of a root of a page tree for a given file (a file page tree). In particular, the file system 518 maintains page trees (file page trees), where each file is represented by a page tree of indirect pages (intermediate nodes of the file page tree) and user data pages (direct blocks/nodes such as leaf nodes of the file page tree). The user data pages are located in a bottom level of the page tree, and one or more levels of indirect pages are located above the bottom level of the page tree. The indirect pages of a particular level comprise references to blocks in a next level down within the page tree (e.g., a reference comprising a file block number of a next level down node or a reference comprising a per-page structure ID of a per-page structure having the file block number of the next level down node). User data pages are located at a lowest level in the page tree and comprise user data. Thus, a page tree for a file may be traversed by the file system 518 using a byte range (e.g., a byte range specified by an I/O operation) mapped to a page index of a page (e.g., a 4k offset) comprising the data within the file to be accessed.

The node 502 may comprise a frontend that hosts one or more frontend processes. A frontend process may be configured to receive operations from clients such as client device 504, and execute the operations using the file system 518 and persistent memory 520 and/or the storage file system 516 and the storage 514. The frontend process may support snapshot operations and volume operations across both the persistent memory storage tier 510 and the storage file system tier 512. When executing certain operations, such as logical unit number (LUN) delete operations, LUN truncate operations, snapshot delete operations, volume delete operations, overwrite operations, and/or other operations, the frontend process may need to free an entire page tree or a subtree of a page tree. However, freeing pages within the persistent memory 520 may take a substantial amount of time, which will increase latency experienced by the client device 504 that issued such operations to the frontend process.

Accordingly, as provided herein, APIs, a log 506, and background workers 501 are provided to free pages from the persistent memory 520. The pages are freed from the persistent memory 520 by the background workers asynchronously in relation to frontend processes executing operations that deleted the pages within the persistent memory 520 (e.g., an operation that deletes a page can be acknowledged as complete by a frontend process, even though the page will be subsequently freed by a background worker). This allows frontend processes to respond to client devices that operations are successful even though the pages have not yet been freed within the persistent memory 520, thus reducing latency and processing time of client I/O. The log 506 is utilized to track page block numbers of pages to free. Add page block number and remove page block number interfaces (APIs) are exposed to the frontend processes and the background workers for adding and removing page block numbers from the log 506.

At 402, the log 506 is maintained by the node 502. The log 506 comprises a list of page block numbers of pages within the persistent memory 520 to free. An add page block number interface is exposed to the frontend of the node 502 so that page block numbers of pages to free from the persistent memory 520 can be inserted into the log 506. In an embodiment, the add page block number interface is implemented as an API that can be invoked to add page block numbers of pages to free into the log 506, such as inofile indirect pages (e.g., an indirect page within an inofile that references a page in a next level down within the inofile), inofile leaf pages (e.g., a leaf page within a bottom level of an inofile, and comprising an inode storing a location of a root of a page tree of a file), file indirect pages (e.g., an indirect page of a page tree of a file), and/or user data pages (e.g., a leaf page of a page tree of a file, and comprising user data).

When a frontend process executes an operation from the client device 504 that will result in freeing one or more pages within the persistent memory 520, the frontend process can invoke the add page block number interface to add page block numbers of the one or more pages into the log 506 without having to actually free the one or more pages. In an example, the frontend process can add a root page block number of a page tree into the log 506 once the root page block number has been unlinked from an inofile and/or fsinfo entry (e.g., a file system information entry for a file system), and has been mirrored to a partner node for unlinking a corresponding root page block number within a file system maintained as a mirrored copy of the file system 518 by the partner node. In this way, the frontend process does not have to wait for the one or more pages to be freed before responding back to the client device 504 that the operation succeeded. This will decrease the latency experienced by the client device 504 because the one or more pages may be freed asynchronously after the frontend process has indicated to the client device 504 that the operation succeeded.

The add page block number interface may be used to add a single page into the log 506 or a batch of pages into the log 506. A single page block number (e.g., a root page block number) may be added into the log 506 for LUN delete operations, snapshot delete operations, and volume delete operations, which will add a root page block number of a page tree being deleted into the log 506. For example, a root page block number of a page tree corresponding to a LUN may be added into the log 506 based upon a LUN delete operation to delete the LUN. A batch of page block numbers may be added into the log 506 for an overwrite operation that will add page block numbers of pages to free into a page block number list, and then add the list of page block numbers into the log 506. Adding a batch of page block numbers may reduce contention on a read/write lock provided for the log 506 (e.g., a lock that allows multiple readers to read from the log 506, but a single writer to write to the log 506 at any given point in time) because an entire batch of page block numbers can be efficiently added into the log 506 at once.

In an embodiment, the log 506 may be maintained as a queue. Frontend processes of the node 502 may insert page block numbers at a tail of the queue, such as by using the add page block number interface. In an embodiment, the log 506 may be implemented as a doubly-linked list of page block numbers to be freed. In an embodiment, the log 506 may be maintained as a non-persistent log. If the node 502 is rebooted, experiences a crash and recovers, or is taken over, then the non-persistent log will be lost. Accordingly, a file system tree of the file system 518 (e.g., a file system buftree) is traversed to reconstruct a current list of page block numbers of pages to free from the persistent memory 520 to recreate the non-persistent log that was lost (e.g., the file system tree can be traversed to identify page block numbers no longer referenced within the file system tree). The current list of page block numbers are inserted into a new instance of the non-persistent log. In an example, the non-persistent log may be accessible from a global per-host in-core structure represented by a queue implemented as a doubly-linked list of volatile memory log pages comprising page block numbers to free. Each volatile memory page has a header with a list of entries for the volatile memory log page. The entries may correspond to page block numbers to free from the persistent memory 520. The non-persistent log may be protected by a read/write lock. The read/write lock allows multiple processes (e.g., a frontend process, a background work, etc.) to read from the non-persistent log, while write operations to the non-persistent log require exclusive access such that only a single process can have write access at a time to the non-persistent log.

In an embodiment, the log 506 may be maintained as a first type of persistent log. The persistent log may be accessible from a file system superblock of the file system 518. A log page of the persistent log comprises a header followed by a list of entries for the log page. The list of entries may correspond to page block numbers to free from the persistent memory 520. The persistent log may be represented as a queue implemented as a doubly-linked list of the log pages comprising page block numbers to free. The persistent log may be read/write lock protected.

In an embodiment, the log 506 may be maintained as a second type of persistent log. The persistent log may have a log head pointer and a log tail pointer that are maintained as volatile pointers in memory. The persistent log may comprise a doubly-linked list of the log pages comprising page block numbers to free and generation counts of the pages to free. A generation count of a page may correspond to a number of times the page has been scavenged (e.g., evicted from the persistent memory 520). Each log page of the persistent log may comprise a next pointer and a previous pointer, which can be used to navigate between the log pages of the persistent log. A persistent per-page structure state associated with a log page may comprise a page type such as a file system log type and a timestamp indicating an order of the log page within the persistent log. Using the persistent per-page structure state to track the log pages as having the file system log type allows for quickly identifying log pages from other types of pages within the persistent memory 520, such as pages corresponding to an inofile, a page tree of a file, etc. This can be used to quickly identify the log pages when performing a reconciliation for the persistent memory 520. The persistent log may not have a header, and may comprise a list of page block numbers and generation count entries for pages to be freed. Each log page may comprise a certain number of entries per log page, such as 510 entries, or any other number of entries.

One or more background workers are implemented to process the log 506 in order to free pages associated with the page block numbers within the log 506. A background worker may access the log 506 and start processing entries of page block numbers starting at a header of the log 506 and proceeding one entry at a time. In an embodiment, a single background worker can process a given log page at a time, and thus different background workers can process different log pages at the same time. A remove page block number interface may be exposed to the background worker. In an embodiment, the remove page block number interface may be implemented as an API. The background worker may utilize the remove page block number interface to remove page block numbers from the log 506 as the page block numbers are processed.

The background workers (e.g., background workers 501 that are executed as background tasks/threads by the node 502) may be executed to asynchronously process the page block numbers within the log 506 for freeing pages within the persistent memory 520. That is, the background workers may free pages after frontend processes have already completed operations that would result in those pages being free, and thus the background workers asynchronously process the log 506 with respect to the frontend processes executing operations.

In an embodiment, the processing of the log 506 may be proactively triggered to free pages identified by page block numbers within the log 506. For example, the processing of the log 506 may be triggered based upon a determination that a frontend operation of a frontend process has a backlog of processing to perform upon the persistent memory 520 such that freeing the pages within the persistent memory 520 will result in freeing up storage resources that can be used by the frontend operation to work through the backlog of processing to perform. A number of background workers to concurrently process the log 506 may be determined based upon an amount of backlog processing to be performed by frontend operations.

In an example, a determination is made that the log 506 is to be processed. A page block number, of a page, within the log 506 is identified, at 404. For example, a background worker may identify the page block number as being at the head of a log page within the log 506 that is currently being processed by the background worker. At 406, a reference count, corresponding to a number of references to the page block number, is identified. For example, an active file system of the persistent memory 520 may reference the page block number if the active file system includes data within the page located at the page block number within the persistent memory 520. When a snapshot of the active file system is created as a read only point in time representation of the active file system, the snapshot will also have a reference to the page block number of the page. Any number of snapshots may be created, and thus the page block number may be referenced any number of times. The reference count may be maintained within a per-page structure for the page, which comprises metadata for the page.

At 408, in response to the reference count being greater than 1, the reference count is decremented. The reference count is decremented to indicate that the page is now referenced by one less object (e.g., the active file system or a snapshot) because the page was freed by an operation executed by a frontend process that inserted the page block number of the page into the log 506 to indicate that the page has been freed from an object (e.g., referenced by one less object) as a result of executing the operation. In an example, the operation may delete a LUN within the active file system, and thus the active file system will no longer references the LUN. Once the reference count has been decremented, the page block number can be removed from the log 506. For example, the background worker may utilize the remove page block number interface to remove the page block number from the log 506. The background worker does not free the page from the persistent memory 520 because there is still one or more objects, such as the active file system and/or one or more snapshots, which reference the page because the reference count started out as being greater than a threshold value (e.g., 1) to indicate that more than one object referenced the page block number.

At 410, in response to the reference count being the threshold value (e.g., 1), the page is freed from the persistent memory 520 because the page will no longer be referenced by any objects, such as the active file system or a snapshot. Once the page has been freed from the persistent memory 520, the page block number can be removed from the log 506. For example, the background worker may utilize the remove page block number interface to remove the page block number from the log 506.

The processing of page block numbers may be dependent upon various factors, such as whether a page is an indirect page that is a parent of one or more children pages, whether a page is a user data page comprising user data, and/or a state of a page. In an embodiment, a page block number, having a reference count of 1, may be identified as corresponding to an indirect page that is a parent page within a page tree maintained by the file system 518 for the persistent memory 520. The parent page may be a parent of one or more children pages within the page tree. Accordingly, page block numbers of the one or more children pages are added into the log 506 for further processing, such as into an end of the log 506 (e.g., a tail of the queue). Once the page block numbers of the one or more children pages are added into the log 506, the parent page is freed from the persistent memory 520 and the page block number of the parent page is removed from the log 506.

In an embodiment, a page block number, having a reference count of 1, may be identified as comprising a user data page maintained within a bottom level of a page tree maintained by the file system 518 for the persistent memory 520. The user data page comprises actual user data. In contrast to the user data page, an indirect page of the page tree comprises one or more references (pointers) to pages within a next level lower within the page tree. In response to the page block number corresponding to the user data page, the user data page is freed from the persistent memory 520 and the page block number of the user data page is removed from the log 506.

In an embodiment, a page block number, having a reference count of 1, may be identified as comprising a user data page maintained within a bottom level of a page tree maintained by the file system 518 for the persistent memory 520. A state of the user data page may be identified. The state may be read from a per-page structure comprising metadata for the user data page. If the state comprises a tiering state, then the user data page is not freed by the background worker because the user data page will be tiered out from the persistent memory 520 and into the storage 514, such as because data of the user data page has become infrequently accessed (cold). If the user data page has a tiering bit set to indicate that the user data page is to be tiered down from the persistent memory 520 to the storage 514, then the background worker may add the user data page to a tier down list by inserting the page block number of the user data page into the tier down list, which may be maintained by the storage file system tier 512 and/or the persistent memory storage tier 510.

In an embodiment, a page block number, having a reference count of 1, may be identified as comprising a user data page maintained within a bottom level of a page tree maintained by the file system 518 for the persistent memory 520. A state of the user data page may be identified. For example, the state may be a read cached state to indicate that the user data page is cached within the persistent memory 520 for read access by client devices. Accordingly, the user data page is freed from the persistent memory 520 and the page block number of the user data page is removed from the log 506.

In an embodiment, a page block number, having a reference count of 1, may be identified as comprising a user data page maintained within a bottom level of a page tree maintained by the file system 518 for the persistent memory 520. A state of the user data page may be identified. For example the state may be a dirty state to indicate that the user data page comprises data that is different than corresponding data within the storage 514 (e.g., data of a file within the storage 514 may be cached within the persistent memory 520, and the cached data may be subsequently modified, and thus comprising different data than the corresponding file in the storage 514). Accordingly, the user data page is freed from the persistent memory 520 and the page block number of the user data page is removed from the log 506.

In an embodiment, a page block number, having a reference count of 1, may be identified as comprising a user data page maintained within a bottom level of a page tree maintained by the file system 518 for the persistent memory 520. A state of the user data page may be identified. For example, the state may be a framing state to indicate that the user data page is dirty (e.g., the user data page comprises data that is different than corresponding data within the storage 514), and that the storage file system tier 512 is to be notified that the user data page is dirty before a snapshot can be created. Accordingly, the user data page is freed from the persistent memory 520 and the page block number of the user data page is removed from the log 506.

Figure 6A:
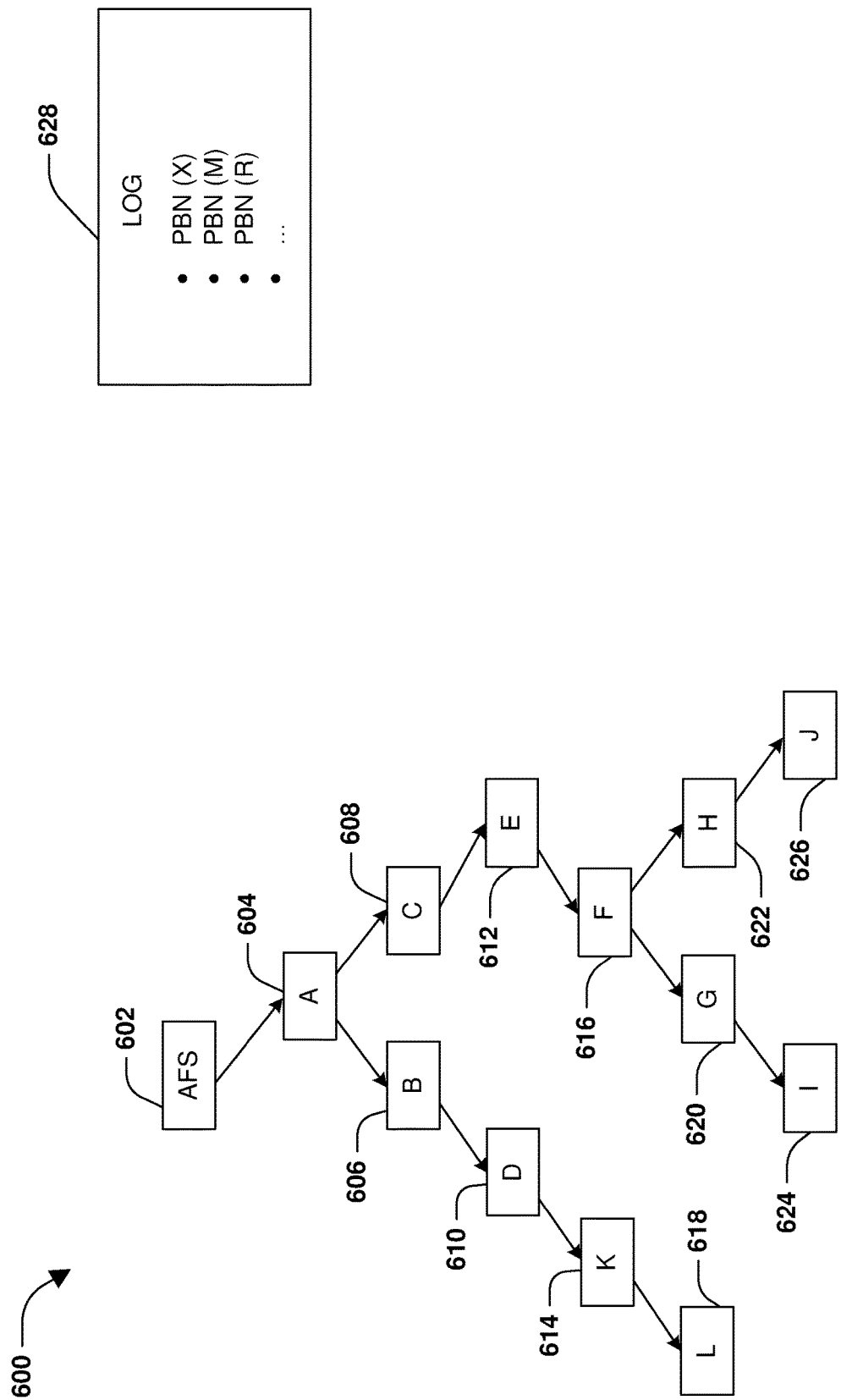
FIG. 6A is a block diagram illustrating an example system for freeing pages within persistent memory, where the log tracks page block numbers of pages within the persistent memory to free.

FIGS. 6A-6G illustrate an example of a system 600 for freeing pages within persistent memory using a log 628 (e.g., an example of log 506 of FIG. 5). The log 628 comprises a list of page block numbers to free, such as a page block number (X), a page block number (M), and a page block number (R), as illustrated by FIG. 6A. An active file system 602 of the persistent memory comprise pages indexed by the page block numbers. A page (A) 604 may be a parent page to page (B) 606 and page (C) 608, which are children pages of the page (A) 604. Page (D) 610 is a child page of the page (B) 606. Page (K) 614 is a child page of the page (D) 610. Page (L) 618 is a child page of the page (K) 614. Page (E) 612 is a child page of the page (C) 608. Page (F) 616 is a child page of the page (E) 612. Page (G) 620 and page (H) 622 are children pages of the page (F) 616. Page (I) 624 is a child page of the page (G) 620. Page (J) 626 is a child page of the page (H) 622. Page (L) 618, page (I) 624, and page (J) 626 are user data pages comprising user data (which, as noted in discussion above, may be leaf pages of a page tree of a file), while the other pages are indirect pages with references (pointers) to their respective child pages.

Figure 6B:
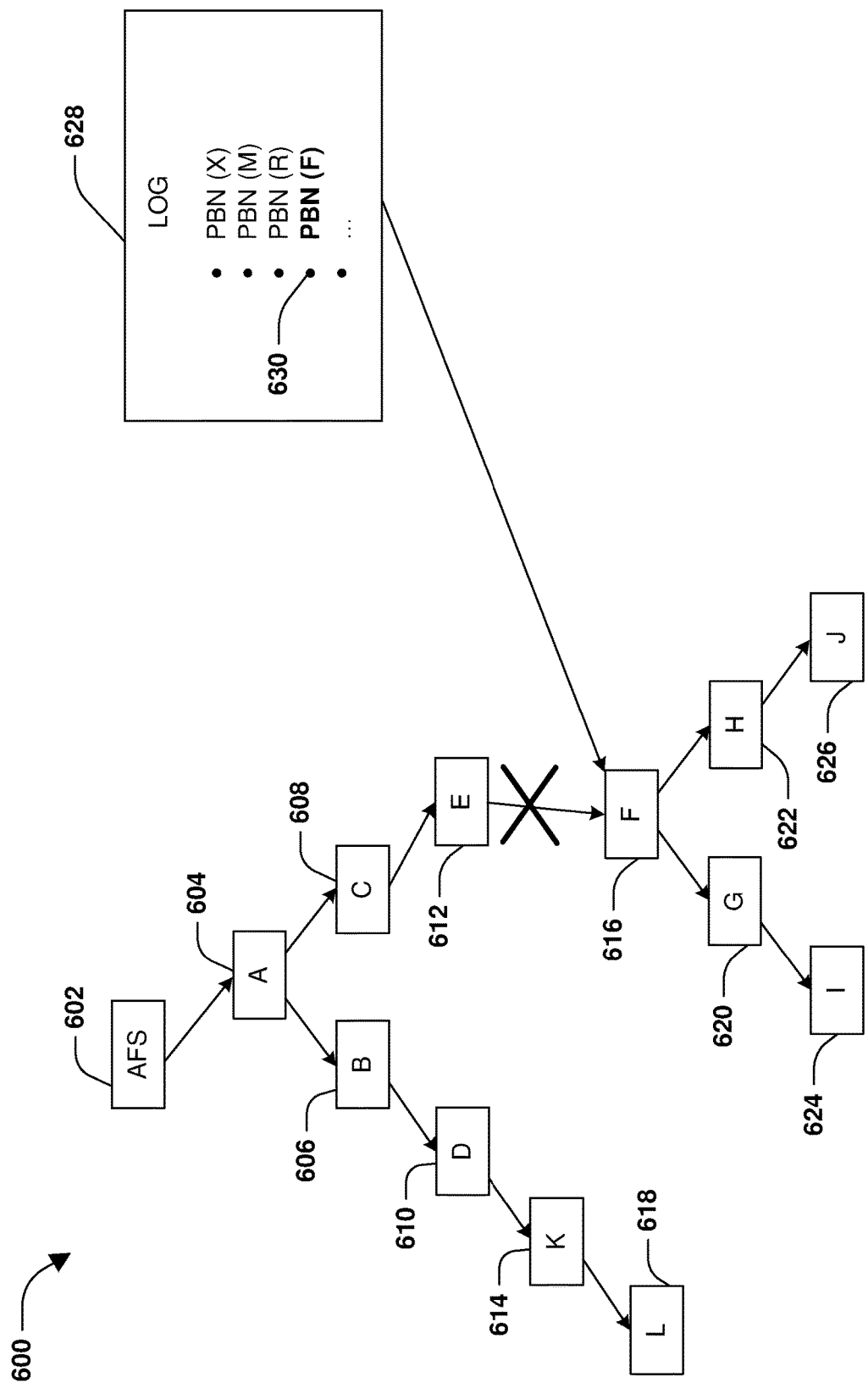
FIG. 6B is a block diagram illustrating an example system for freeing pages within persistent memory, where a page block number (F) is added into the log.

A frontend process may perform an operation that deletes a LUN corresponding to page (F) 616, page (G) 620, page (H) 622, page (I) 624, and page (J) 626. Page (F) 616 may be a root page of the LUN, page (G) 620 and page (H) 622 are indirect pages of the LUN, and page (I) 624 and page (J) 626 are user data pages comprising data of the LUN. Accordingly, the frontend process inserts initially a page block number (F) 630 of the page (F) 616 into the log 628 because the page (F) 616 is the root page of the LUN, as illustrated by FIG. 6B.

A background worker may be invoked to process the log 628 in order to free pages having page block numbers listed within the log 628. While processing the log 628, the background worker may free pages corresponding to the page block number (X), the page block number (M), and the page block number (R). For example, those pages may be merely referenced by a single snapshot, and thus have reference counts of 1. Accordingly, the background worker frees the pages and removes the page block number (X), the page block number (M), and the page block number (R) from the log 628, as illustrated by FIG. 6C. When the background worker encounters the page block number (F) 630 within the log 628, the background worker determines that the page (F) 616 is a parent to the page (G) 620 and the page (H) 622. Accordingly, a page block number (G) 632 of the page (G) 620 and a page block number (H) 634 of the page (H) 622 are inserted into the log 628. The page (F) 616 is freed from the persistent memory, and the page block number (F) 630 is removed from the log 628.

Figure 6D:
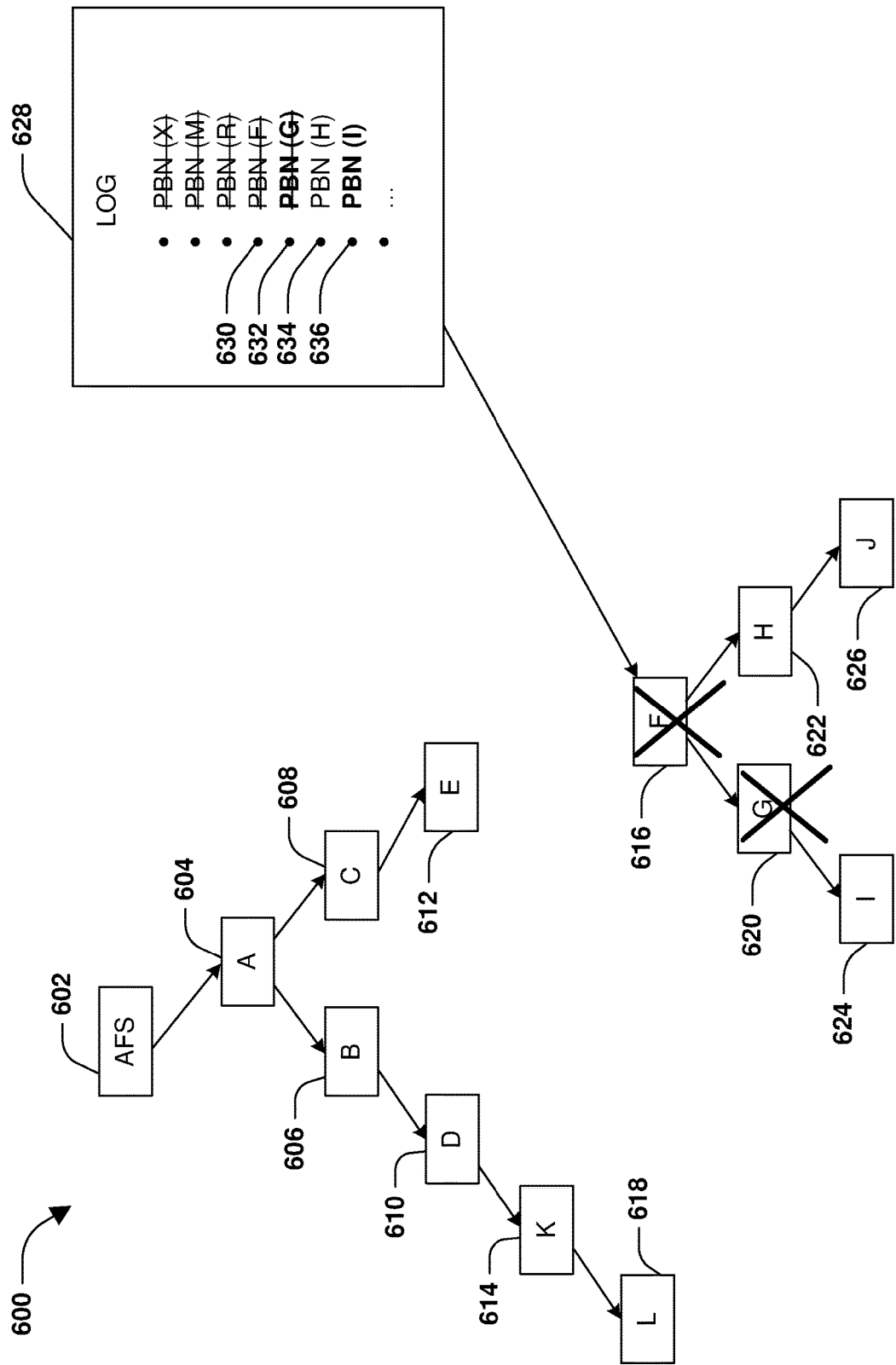
FIG. 6D is a block diagram illustrating an example system for freeing pages within persistent memory, where a page block number (G) is processed.

The background worker processes the next page block number in the log 628, which is the page block number (G) 632 (in the log) of the page (G) 620 (in the tree), as illustrated by FIG. 6D. When the background worker encounters the page block number (G) 632 within the log 628, the background worker determines that the page (G) 620 is a parent to the page (I) 624. Accordingly, a page block number (I) 636 of the page (I) 624 is inserted into the log 628. The page (G) 620 is freed from the persistent memory, and the page block number (G) 632 is removed from the log 628.

Figure 6E:
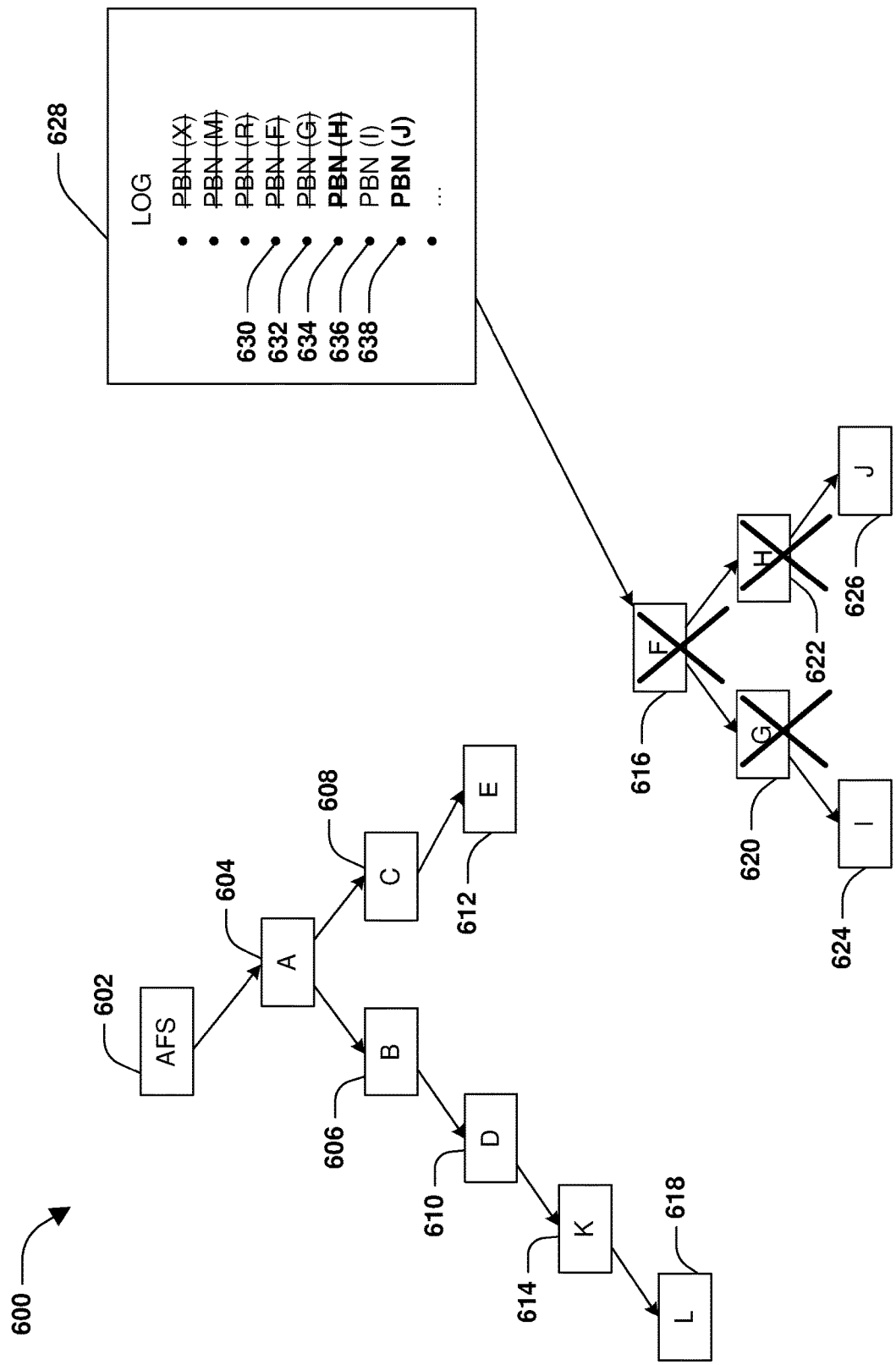
FIG. 6E is a block diagram illustrating an example system for freeing pages within persistent memory, where a page block number (H) is processed.

The background worker processes the next page block number in the log 628, which is the page block number (H) 634 (in the log) of the page (H) 622 (in the tree), as illustrated by FIG. 6E. When the background worker encounters the page block number (H) 634 within the log 628, the background worker determines that the page (H) 622 is a parent to the page (J) 626. Accordingly, a page block number (J) 638 of the page (J) 626 is inserted into the log 628. The page (H) 622 is freed from the persistent memory, and the page block number (H) 634 is removed from the log 628.

Figure 6F:
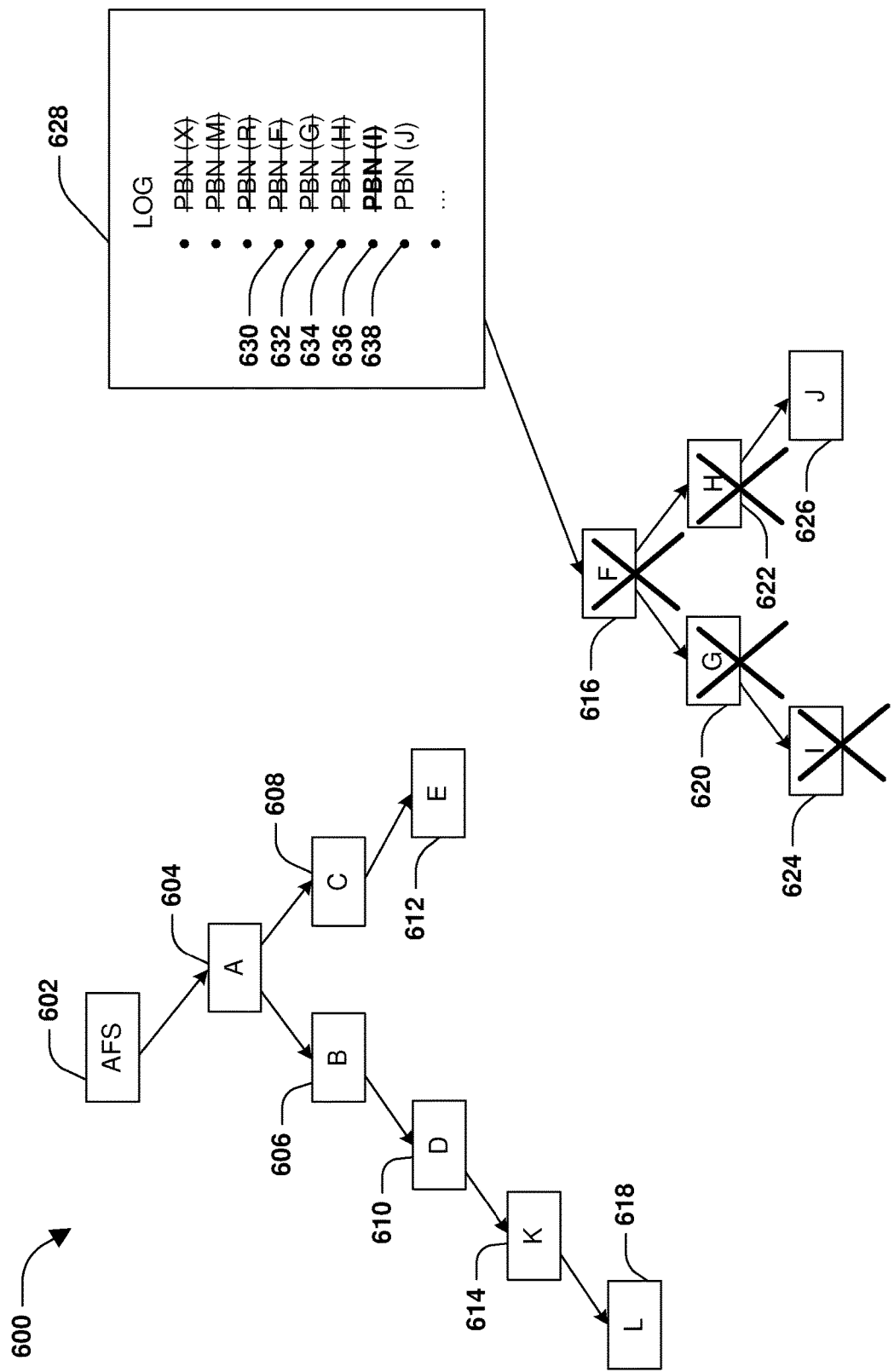
FIG. 6F is a block diagram illustrating an example system for freeing pages within persistent memory, where a page block number (I) is processed.

The background worker processes the next page block number in the log 628, which is the page block number (I) 636 of the page (I) 624, as illustrated by FIG. 6F. When the background worker encounters the page block number (I) 636 within the log 628, the background worker determines that the page (I) 624 is a user data page. Accordingly, the page (I) 624 is freed from the persistent memory, and the page block number (I) 636 is removed from the log 628 because the page block number (I) 636 is part of the LUN being deleted by the operation.

Figure 6G:
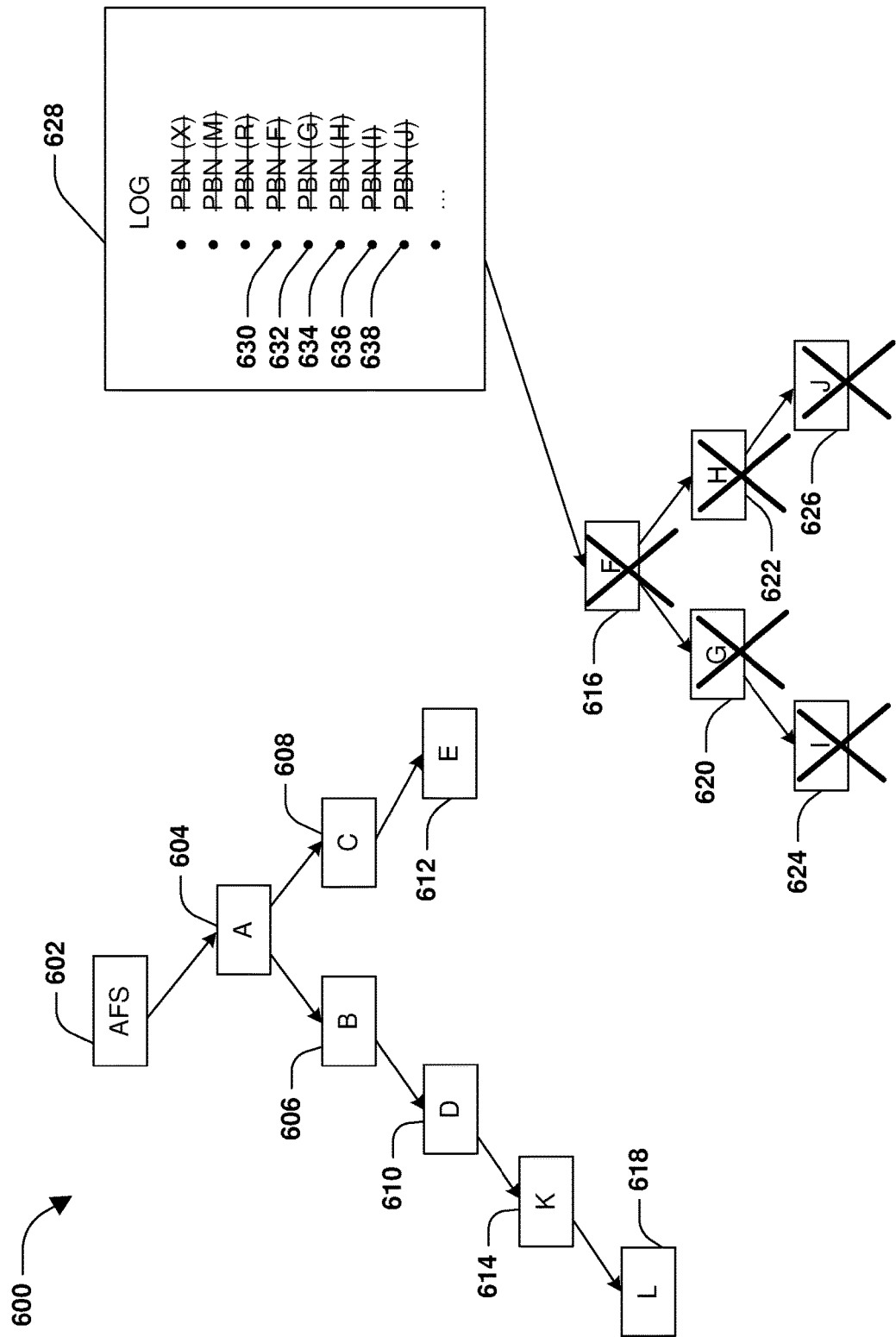
FIG. 6G is a block diagram illustrating an example system for freeing pages within persistent memory, where a page block number (J) is processed.

The background worker processes the next page block number in the log 628, which is the page block number (J) 638 of the page (J) 626, as illustrated by FIG. 6G. When the background worker encounters the page block number (J) 638 within the log 628, the background worker determines that the page (J) 626 is a user data page. Accordingly, the page (J) 626 is freed from the persistent memory, and the page block number (J) 638 is removed from the log 628. In this way, the log 628 is processed to free pages within the persistent memory.

According to aspects of the present disclosure, an apparatus/machine/system for freeing blocks within persistent memory using a log; a means for maintaining a log comprising a list of page block numbers of pages within persistent memory of a node to free; a means for identifying a page block number, of a page, within the log to process; a means for identifying a reference count corresponding to a number of references to the page block number; a means for in response to the reference count being greater than 1, decrementing the reference count and removing the page block number from the log; and a means for in response to the reference count being 1, freeing the page from the persistent memory and removing the page block number from the log.

Figure 7:
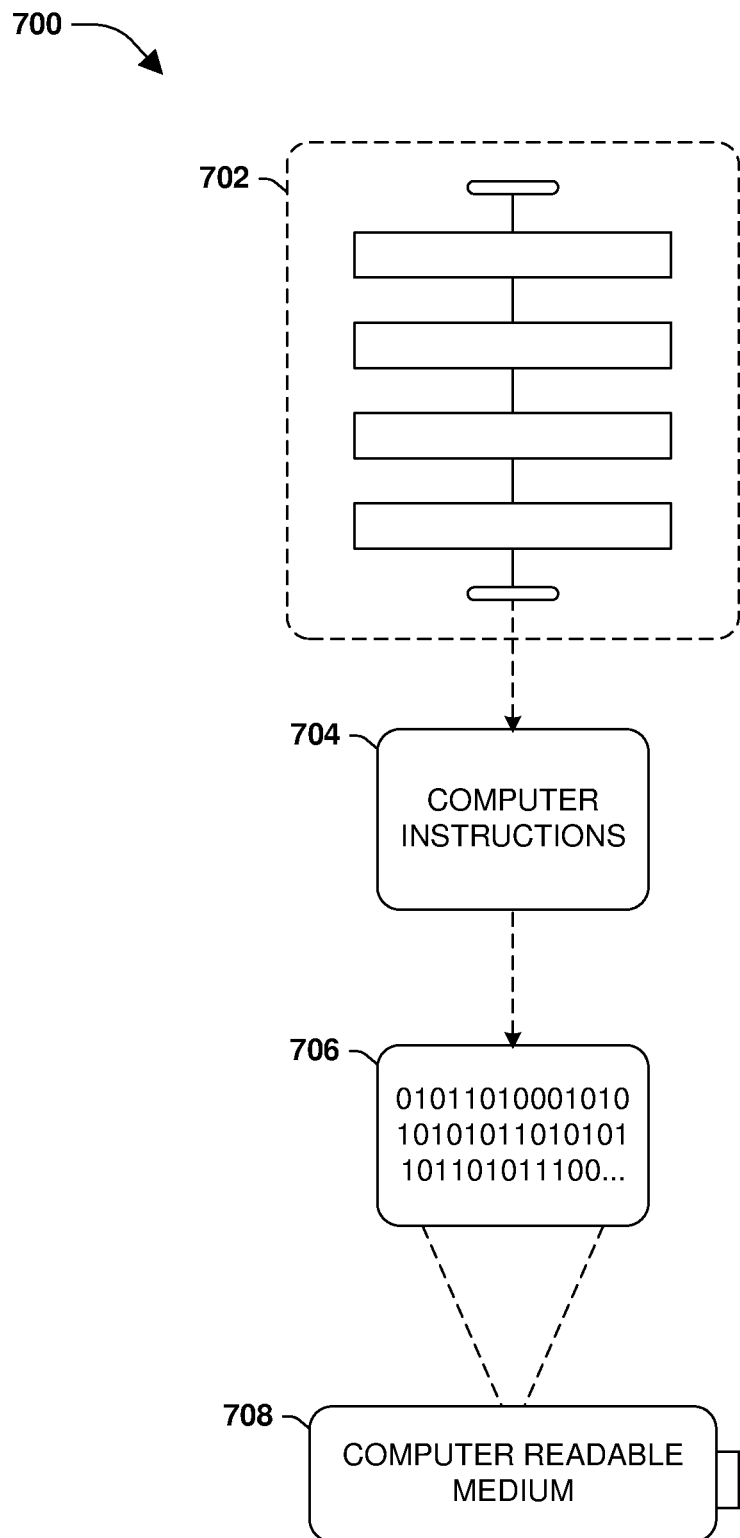
FIG. 7 is an example of a computer readable medium in which an embodiment of the invention may be implemented.

Still another embodiment involves a computer-readable medium 700 comprising processor-executable instructions configured to implement one or more of the techniques presented herein. An example embodiment of a computer-readable medium or a computer-readable device that is devised in these ways is illustrated in FIG. 7, wherein the implementation comprises a computer-readable medium 708, such as a compact disc-recordable (CD-R), a digital versatile disc-recordable (DVD-R), flash drive, a platter of a hard disk drive, etc., on which is encoded computer-readable data 706. This computer-readable data 706, such as binary data comprising at least one of a zero or a one, in turn comprises processor-executable computer instructions 704 configured to operate according to one or more of the principles set forth herein. In some embodiments, the processor-executable computer instructions 704 are configured to perform a method 702, such as at least some of the exemplary method 400 of FIG. 4, for example. In some embodiments, the processor-executable computer instructions 704 are configured to implement a system, such as at least some of the exemplary system 500 of FIG. 5 and/or at least some of the exemplary system 600 of FIGS. 6A-6G, for example. Many such computer-readable media are contemplated to operate in accordance with the techniques presented herein.

In an embodiment, the described methods and/or their equivalents may be implemented with computer executable instructions. Thus, in an embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on. In an embodiment, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A computing device comprising:
  a persistent memory storage tier of a storage operating system storage stack, wherein the persistent memory storage tier manages a persistent memory file system that stores data within a plurality of pages of persistent memory according to byte-addressable access; and
  a storage file system tier of the storage operating system storage stack, wherein the storage file system tier manages a storage file system that stores data within a storage device according to block-addressable access, wherein the persistent memory storage tier and the storage file system tier facilitate communication between the persistent memory file system and the storage file system, and wherein the persistent file system utilizes byte-address access semantics to access the plurality of pages within the persistent memory and the storage file system uses block-addressable access semantics to access data blocks stored within the storage device.

2. The computing device of claim 1, comprising:
a frontend process configured to process client operations directed to data managed by at least one of the persistent memory file system or the storage file system; and
an application programming interface (API) providing the frontend process with access to a log for inserting page block numbers of pages within the persistent memory to free.

3. The computing device of claim 2, wherein the frontend process inserts, into the log utilizing the API, a page block number of a page storing data targeted by a delete operation received by the frontend process from a client, wherein the frontend process responds back to the client that the delete operation was successfully performed in response to inserting the page block number into the log and before the page has been freed from the persistent memory.

4. The computing device of claim 2, wherein the frontend process inserts, into the log utilizing the API, a root page block number of a page in response to the root page block number being unlinked from at least one of an inofile or a file system information entry.

5. The computing device of claim 2, wherein the frontend process is hosted by a first node comprising the persistent memory storage tier and the storage file system tier, and wherein the frontend process inserts, into the log utilizing the API, a root page block number of a page in response to the root page block number being unlinked by the first node and an unlink command being mirrored to a second node for unlinking a corresponding root page block number within a filesystem maintained by the second node.

6. The computing device of claim 1, comprising:
a backend worker configured to process a log of page block numbers of pages within the persistent memory to free; and
an application programming interface (API) providing the backend worker with access to a log for reading and removing the page block numbers from the log.

7. The computing device of claim 1, comprising:
a backend worker configured to process a log of page block numbers of pages within the persistent memory to free, wherein the backend worker decrements a reference count and removes the page block number from the log based upon the reference count being greater than a threshold value.

8. The computing device of claim 1, comprising:
a backend worker configured to process a log of page block numbers of pages within the persistent memory to free, wherein the backend worker frees the page from the persistent memory and removes the page block number from the log based upon a reference count being less than a threshold value.

9. A method, comprising:
managing, by a persistent memory storage tier if a storage operating system storage stack, a persistent memory file system that stores data within a plurality of pages of persistent memory according to byte-addressable access; and
managing, by storage file system tier of the storage operating system storage stack, a storage file system that stores data within a storage device according to block-addressable access, wherein the persistent memory storage tier and the storage file system tier facilitate communication between the persistent memory file system and the storage file system, and wherein the persistent file system utilizes byte-address access semantics to access the plurality of pages within the persistent memory and the storage file system uses block-addressable access semantics to access data blocks stored within the storage device.

10. The method of claim 9, comprising:
utilizing a log to track page block numbers of pages within persistent memory to free; and
in response to adding, into the log, a page block number of a parent page within a page tree maintained by the persistent memory file system, adding, into the log, a page block number of a child page that is a child of the parent page.

11. The method of claim 9, comprising:
utilizing a log to track page block numbers of pages within persistent memory to free; and
processing the page block numbers of the log to free pages having reference counts less than a threshold value, wherein a page is freed based upon the page corresponding to a user data page maintained within a bottom level of page tree maintained by the persistent memory file system.

12. The method of claim 9, comprising:
utilizing a log to track page block numbers of pages within persistent memory to free; and
processing the page block numbers of the log to free pages having reference counts less than a threshold value, wherein a page is freed from the persistent memory based upon the page having a read cached state.

13. The method of claim 9, comprising:
routing an operation through the storage operating system storage stack, wherein the operation is routed to the persistent memory storage tier before being routed to the storage file system tier based upon the persistent memory storage tier being a higher level tier within the storage operating system storage stack than the storage file system tier.

14. The method of claim 9, comprising:
utilizing a log to track page block numbers of pages within persistent memory to free; and
processing the page block numbers of the log to free pages having reference counts less than a threshold value, wherein a page block number within the log is skipped for processing based the page block number corresponding to a page having a tiering state.

15. The method of claim 9, comprising:
utilizing a log to track page block numbers of pages within persistent memory to free; and
processing the page block numbers of the log to free pages having reference counts less than a threshold value, wherein a page having a page block number within the log is freed based upon the page having a dirty state.

16. A non-transitory machine readable medium comprising instructions for performing a method, which when executed by a machine, causes the machine to:
manage, by a persistent memory storage tier if a storage operating system storage stack, a persistent memory file system that stores data within a plurality of pages of persistent memory according to byte-addressable access;
manage, by storage file system tier of the storage operating system storage stack, a storage file system that stores data within a storage device according to block-addressable access, wherein the persistent memory storage tier and the storage file system tier facilitate communication between the persistent memory file system and the storage file system, and wherein the persistent file system utilizes byte-address access semantics to access the plurality of pages within the persistent memory and the storage file system uses block-addressable access semantics to access data blocks stored within the storage device; and utilize a log to track page block numbers of pages within persistent memory to free.

17. The non-transitory machine readable medium of claim 16, wherein the instructions cause the machine to:
process the page block numbers of the log to free pages having reference counts less than a threshold value, wherein a page having a page block number within the log is freed based upon the page having a framing state.

18. The non-transitory machine readable medium of claim 16, wherein the instructions cause the machine to:
in response to the log comprising a page block number of a user data page having a tier bit set to indicate that the user data page is to be tiered down from the persistent memory to the storage device, add the user data page to a tier down list.

19. The non-transitory machine readable medium of claim 16, wherein the instructions cause the machine to:
in response a user data page having a tier bit set to indicate that the user data page is to be tiered down from the persistent memory to the storage device, refrain from freeing the user data page corresponding to a page block number within the log.

20. The non-transitory machine readable medium of claim 16, wherein the instructions cause the machine to:
free a page having a page block number within the log based upon the page block number corresponding to a user data page maintained within a bottom level of a page tree associated with the persistent memory.

* * * * *